US009672255B2

(12) United States Patent
Lange et al.

(10) Patent No.: US 9,672,255 B2
(45) Date of Patent: *Jun. 6, 2017

(54) SOCIAL MEDIA IMPACT ASSESSMENT

(71) Applicant: Microsoft Technology Licensing, LLC, Redmond, WA (US)

(72) Inventors: Danny B. Lange, Sammamish, WA (US); Hung-Chih Yang, Bellevue, WA (US); Xiong Zhang, Shanghai (CN); Graham A. Wheeler, Redmond, WA (US); Jason J. Joyce, Redmond, WA (US); David M. Moore, Snohomish, WA (US); Bhalchandra Pandit, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,465

(22) Filed: Mar. 3, 2016

(65) Prior Publication Data
US 2016/0188604 A1    Jun. 30, 2016

Related U.S. Application Data

(63) Continuation of application No. 13/733,009, filed on Jan. 2, 2013, now Pat. No. 9,294,576.

(51) Int. Cl.
*G06F 17/30* (2006.01)
*H04L 29/08* (2006.01)
(Continued)

(52) U.S. Cl.
CPC ........ *G06F 17/3053* (2013.01); *G06F 3/0482* (2013.01); *G06F 3/04817* (2013.01);
(Continued)

(58) Field of Classification Search
USPC ................................ 707/603, 793, 708, 738
See application file for complete search history.

(56) References Cited

U.S. PATENT DOCUMENTS 7,239,708 B2    7/2007    England et al.
7,580,931 B2    8/2009    Liu et al.
(Continued)

FOREIGN PATENT DOCUMENTS

KR    20120137542 A    12/2012
WO    2012171073 A1    12/2012

OTHER PUBLICATIONS

Afrati, Foto and Jeffery D. Ullman, "Optimizing Joins in a Map-Reduce Environment", VLDB '09, Aug. 24-28, 2009, 15 pages.
(Continued)

*Primary Examiner* — Cam-Linh Nguyen
(74) *Attorney, Agent, or Firm* — Harness, Dickey & Pierce, P.L.C.

(57) ABSTRACT

This patent relates to a system for identifying influential users of a social network platform. The system may access records of messages sent or received by a plurality of users. The system can determine a power of a user to reach other users based at least in part on the messages. The system can determine an authority of the user on a topic. The system can also compute an impact score that reflects both the power and the authority of the user on the topic. Such scores may be used to select users based on impact as part of social trend analysis, marketing or other functions.

20 Claims, 7 Drawing Sheets

(51) Int. Cl.
 G06Q 30/02 (2012.01)
 G06Q 50/00 (2012.01)
 G06F 3/0481 (2013.01)
 G06F 3/0482 (2013.01)
 G06F 3/0484 (2013.01)
 H04L 12/58 (2006.01)

(52) U.S. Cl.
 CPC .... *G06F 3/04842* (2013.01); *G06F 17/30038* (2013.01); *G06F 17/30554* (2013.01); *G06F 17/30867* (2013.01); *G06Q 30/02* (2013.01); *G06Q 30/0255* (2013.01); *G06Q 30/0269* (2013.01); *G06Q 50/01* (2013.01); *H04L 51/32* (2013.01); *H04L 67/22* (2013.01); *H04L 67/306* (2013.01)

(56) References Cited

U.S. PATENT DOCUMENTS

| | | | |
|---|---|---|---|
| 7,584,183 | B2 | 9/2009 | Hegerty |
| 7,600,017 | B2 | 10/2009 | Holtzman et al. |
| 7,818,334 | B2 | 10/2010 | Najork |
| 7,865,496 | B1* | 1/2011 | Schiller ............ G06F 17/30699 707/708 |
| 7,930,302 | B2 | 4/2011 | Bandaru et al. |
| 8,010,460 | B2 | 8/2011 | Work et al. |
| 8,312,056 | B1 | 11/2012 | Peng |
| 8,326,880 | B2 | 12/2012 | Carson et al. |
| 8,543,454 | B2 | 9/2013 | Fleischman et al. |
| 8,606,792 | B1 | 12/2013 | Jackson et al. |
| 8,655,938 | B1 | 2/2014 | Smith |
| 9,218,630 | B2 | 12/2015 | Yang et al. |
| 2002/0062368 | A1 | 5/2002 | Holtzman et al. |
| 2003/0097655 | A1 | 5/2003 | Novak |
| 2003/0221166 | A1 | 11/2003 | Farahat et al. |
| 2004/0128273 | A1 | 7/2004 | Amitay et al. |
| 2005/0114896 | A1 | 5/2005 | Hug |
| 2005/0159970 | A1 | 7/2005 | Buyukkokten |
| 2005/0251487 | A1 | 11/2005 | Evans et al. |
| 2005/0273629 | A1 | 12/2005 | Abrams |
| 2006/0004691 | A1 | 1/2006 | Sifry |
| 2006/0042483 | A1 | 3/2006 | Work et al. |
| 2006/0184464 | A1 | 8/2006 | Tseng |
| 2006/0184481 | A1 | 8/2006 | Zhang et al. |
| 2006/0242078 | A1 | 10/2006 | Evans et al. |
| 2006/0242554 | A1 | 10/2006 | Gerace |
| 2007/0083469 | A1 | 4/2007 | Kaufman |
| 2007/0118498 | A1 | 5/2007 | Song |
| 2007/0198510 | A1 | 8/2007 | Ebanks |
| 2007/0204078 | A1 | 8/2007 | Boccon-Gibbod |
| 2007/0271272 | A1 | 11/2007 | McGuire et al. |
| 2008/0066181 | A1 | 3/2008 | Haveson et al. |
| 2008/0070209 | A1 | 3/2008 | Zhuang et al. |
| 2008/0071904 | A1 | 3/2008 | Schuba |
| 2008/0109399 | A1 | 5/2008 | Liao et al. |
| 2008/0168523 | A1 | 7/2008 | Ansari et al. |
| 2008/0187231 | A1 | 8/2008 | Barbieri et al. |
| 2008/0222044 | A1 | 9/2008 | Gottlieb |
| 2008/0256051 | A1 | 10/2008 | Liu et al. |
| 2009/0006371 | A1 | 1/2009 | Denoue et al. |
| 2009/0006398 | A1 | 1/2009 | Lam et al. |
| 2009/0037382 | A1 | 2/2009 | Ansari et al. |
| 2009/0048904 | A1 | 2/2009 | Newton et al. |
| 2009/0048990 | A1 | 2/2009 | Gross |
| 2009/0049018 | A1 | 2/2009 | Gross |
| 2009/0091443 | A1 | 4/2009 | Chen et al. |
| 2009/0144418 | A1 | 6/2009 | Alstyne |
| 2009/0164904 | A1 | 6/2009 | Horowitz et al. |
| 2009/0171748 | A1 | 7/2009 | Aven et al. |
| 2009/0208180 | A1 | 8/2009 | Ashby et al. |
| 2009/0217343 | A1 | 8/2009 | Bellwood et al. |
| 2009/0240944 | A1 | 9/2009 | Cho |
| 2009/0276500 | A1 | 11/2009 | Karmarkar |
| 2009/0312033 | A1 | 12/2009 | Shen et al. |
| 2010/0119053 | A1 | 5/2010 | Goeldi |
| 2010/0121707 | A1 | 5/2010 | Goeldi |
| 2010/0121849 | A1 | 5/2010 | Goeldi |
| 2010/0138903 | A1 | 6/2010 | Medvinsky |
| 2010/0228611 | A1 | 9/2010 | Shenfield |
| 2010/0228614 | A1 | 9/2010 | Zhang |
| 2010/0228631 | A1 | 9/2010 | Zhang |
| 2010/0268830 | A1 | 10/2010 | McKee et al. |
| 2011/0022602 | A1 | 1/2011 | Luo et al. |
| 2011/0178995 | A1 | 7/2011 | Suchter et al. |
| 2011/0218960 | A1 | 9/2011 | Hatami-Hanza |
| 2011/0231296 | A1 | 9/2011 | Gross et al. |
| 2011/0246484 | A1 | 10/2011 | Dumais et al. |
| 2011/0270845 | A1 | 11/2011 | Lin |
| 2011/0271232 | A1 | 11/2011 | Crochet |
| 2012/0059710 | A1 | 3/2012 | Dutta |
| 2012/0110464 | A1 | 5/2012 | Chen et al. |
| 2012/0117059 | A1 | 5/2012 | Bailey et al. |
| 2012/0150754 | A1 | 6/2012 | Belady et al. |
| 2012/0166931 | A1 | 6/2012 | Alonso et al. |
| 2012/0209832 | A1 | 8/2012 | Neystadt et al. |
| 2012/0209920 | A1 | 8/2012 | Neystadt et al. |
| 2012/0215597 | A1 | 8/2012 | Ross |
| 2012/0221559 | A1 | 8/2012 | Kidron |
| 2012/0226536 | A1 | 9/2012 | Kidron |
| 2012/0254184 | A1 | 10/2012 | Choudhary |
| 2012/0317200 | A1 | 12/2012 | Chan |
| 2012/0324023 | A1 | 12/2012 | Di Sciullo et al. |
| 2012/0331399 | A1 | 12/2012 | Eidelson et al. |
| 2013/0006736 | A1 | 1/2013 | Bethke et al. |
| 2013/0013678 | A1 | 1/2013 | Murthy |
| 2013/0014223 | A1 | 1/2013 | Bhatia et al. |
| 2013/0041860 | A1 | 2/2013 | Lawrence et al. |
| 2013/0054591 | A1 | 2/2013 | Park et al. |
| 2013/0054631 | A1 | 2/2013 | Govani et al. |
| 2013/0066706 | A1 | 3/2013 | Wu et al. |
| 2013/0066711 | A1 | 3/2013 | Llyanage et al. |
| 2013/0085838 | A1 | 4/2013 | Tennenholtz et al. |
| 2013/0097180 | A1 | 4/2013 | Tseng |
| 2013/0117097 | A1 | 5/2013 | Bachman |
| 2013/0117364 | A1 | 5/2013 | Bania et al. |
| 2013/0124626 | A1 | 5/2013 | Cathcart et al. |
| 2013/0151345 | A1 | 6/2013 | Brelig |
| 2013/0151348 | A1 | 6/2013 | Paul |
| 2013/0173333 | A1 | 7/2013 | Zhang |
| 2013/0173485 | A1 | 7/2013 | Ruiz et al. |
| 2013/0179440 | A1 | 7/2013 | Gordon |
| 2013/0197970 | A1 | 8/2013 | Aaskov et al. |
| 2013/0212479 | A1 | 8/2013 | Willis |
| 2013/0254280 | A1 | 9/2013 | Yang et al. |
| 2013/0311563 | A1 | 11/2013 | Huberman et al. |
| 2014/0089059 | A9 | 3/2014 | Vesely et al. |
| 2014/0189000 | A1 | 7/2014 | Zhang et al. |
| 2014/0189536 | A1 | 7/2014 | Lange et al. |
| 2016/0125432 | A1 | 5/2016 | Yang et al. |
| 2016/0203187 | A1 | 7/2016 | Alonso et al. |

OTHER PUBLICATIONS

Balahur at el., "Summarizing Threads in Blogs Using Opinion Polarity", Proceedings of the International Workshop Events in Emerging Text Types (eETTs)', 2009, pp. 23-31, 9 pages.

Balkir, A. Soner, "Big Data: Simulating Secondary Sort on Values with Hadoop", Jan. 26, 2010, retrieved at <<sonerbalkir.blogspot.com/2010/01/simulating-secondary-sort-on-values.html>> on Jan. 18, 2012, 6 pages.

Barecke et al., "Summarizing Video Information Using Self-Organizing Maps," IEEE International Conference on Fuzzy Systems, Jul. 16, 2006, pp. 540-546, 7 pages.

Cao et al., "Density-Based Clustering over an Evolving Data Stream with Noise", Proceedings of the 2006 SIAM Conference on Data Mining, Apr. 20-26, 2006, 12 pages.

Chitu, Alex, "Google to Launch a Microblogging Search Engine", Jun. 13, 2009, retrieved at <<http://googlesystem.blogspot.com/2009/06/google-to-launch-microblogging-search.html>> on Jan. 22, 2014, 3 pages.

(56) References Cited

OTHER PUBLICATIONS

Customerthink, "Author Ranking System", Aug. 22, 2008, retrieved at <<http://www.customerthink.com/author_ranking>> on Aug. 6, 2010, 3 pages.
Digital Video Broadcasting, "DVB: IP Datacast over DVB-H: Service Purchase and Protection (SPP)", DVB Document A100, Jul. 2009, 278 pages.
Elsas, Jonathan L.,"Search in Conversational Social Media Collections", Third Annual Workshop on Search in Social Media (SSM), Feb. 3, 2010, 2 pages.
Gao et al., "Ranking on Large-Scale Graphs with Rich Metadata", Microsoft Research, WWW 2011 Tutorial, Mar. 28-Apr. 1, 2011, 124 pages.
Gill, Kathy E., "How can we measure the influence of the blogosphere?", WWW2004, May 17-22, 2004, 8 pages.
Grosseck, Gabriela, "Indicators for the analysis of learning and practice communities from the perspective of microblogging as a provocative sociolect in virtual space", 5th International Scientific Conference, Apr. 9-10, 2009, Bucharest, 10 pages.
Gryc, Wojciech and Karo Moilanen, "Leveraging Textual Sentiment Analysis with Social Network Modelling", T2PP Workshop, Apr. 9-10, 2010, Vrije Universiteit Amsterdam, 14 pages.
Harrison, David, "Using micro-blogging to record architectural design conversation alongside the BIM", May 11, 2009, retrieved at <<http://www.stress-free.co.nz/using_microblogging_to_record_architectural_design_conversation_alongside_the_bim>> on Jan. 22, 2014, 10 pages.
Hore et al., "A Fuzzy C Means Variant for Clustering Evolving Data Streams," Oct. 7, 2007, IEEE International Conference on Systems, Man and Cybernetics, pp. 360-365, 6 pages.
Hore et al., "Creating Streaming Iterative Soft Clustering Algorithms," NAFIPS '07, Annual Meeting of the North American Fuzzy Information Processing Society, Jul. 16, 2007, 5 pages.
Hu et al., "Comments-Oriented Blog Summarization by Sentence Extraction", Conference on Information and Knowledge Management, Nov. 6-8, 2007, pp. 901-904, 4 pages.
Java et al., "Why We Twitter: Understanding Microblogging Usage and Communities", Joint 9th WEBKDD and 1st SNA-KDD Workshop '07, Aug. 12, 2007, 10 pages.
Jiang Wei and Pierre Brice, "Data Stream Clustering and Modeling Using Context-Trees," IEEE, Jun. 8, 2009, 6 pages.
Kelkar et al., "Visualizing Search Results as Web Conversations", WWW 2009, Apr. 20-24, 2009, 4 pages.
Microsoft, "Infer.NET", retrieved at <<http://research.microsoft.com/en-us/um/cambridge/projects/infernet/>> on Jan. 18, 2012, 1 page.
Nair, Lenin, "How to Remove Duplicate Content From Your Blogger Blog Posts to Avoid SERP Penalty", Oct. 26, 2008, retrieved at <<http://cutewriting.blogspot.com/2008/10/how-to-remove-duplicate-content-from.html>> on Jan. 22, 2014, 5 pages.
Nassar, Samer and Joerg Sander, "Effective Summarization of Multi-Dimensional Data Streams for Historical Stream Mining", Proceedings of the 19th International Conference on Scientific and Statistical Database Management, 2007, 10 pages.
Pal, Aditya and Scott Counts, "Identifying Topical Authorities in Microblogs", WSDM '11, Feb. 9-12, 2011, 10 pages.
Park et al., "Web Content Summarization Using Social Bookmarking Service", NII Technical Report, Apr. 2008, 5 pages.
Peerindex, "About Your Peerindex Score", retrieved at <<http://www.peerindex.net/help/scores>> on Aug. 6, 2010, 3 pages.
Pinto et al., "Clustering Narrow-Domain Short Texts by Using the Kullback-Leibler Distance", CICLing 2007, pp. 611-622, 12 pages.
Sharifi et al., "Summarizing Microblogs Automatically", HLT '10 Human Language Technologies: The 2010 Annual Conference of the North American Chapter of the Association for Computational Linguistics, Jun. 2010, pp. 685-688, 4 pages.
Spinn3r, "Spinn3r: Social Media Rank for Twitter", published Jun. 13, 2009, retrieved at <<http://spinn3r.com/rank/>> on Aug. 6, 2010, 3 pages.
Straw000, "3 Quick Ways to Check Your Twitter Ranking/Reach/Authority", published Jan. 12, 2009, retrieved at <<http://allthatsnew.wordpress.com/2009/01/12/3-quick-ways-to-check-your-twitter-rankingreachauthority/>> on Aug. 6, 2010, 7 pages.
Sysomos Inc, "Judging a Twitter User by Their Followers", published Jun. 2010, retrieved at <<http://sysomos.com/insidetwitter/followers/>> on Aug. 6, 2010, 11 pages.
Tan et al., "User-Level Sentiment Analysis Incorporating Social Networks", KDD '11, Aug. 21-24, 2011, San Diego, CA, 9 pages.
Tang et al., "Social Influence Analysis in Large-scale Networks", KDD '09, Jun. 28-Jul. 1, 2009, Paris, France, 9 pages.
Valverde, Cristina Garcia and Ruben Cano Collado, "Digital Rights Management", Master's Thesis, Report No. LITH-ISY-EX-3423-2003, Jul. 15, 2003, 153 pages.
Weng et al., "TwitterRank: Finding Topic-sensitive Influential Twitterers", WSDM '10, Feb. 4-6, 2010, pp. 261-270, New York City, New York, 10 pages.
Wesley, Erik, "Microsoft's Bing Search Engine to Index Microblogging and Twitter Tweets", published Jul. 2, 2009, retrieved at <<http://www.associatedcontent.com/article/1903504/microsofts_bing_search_engine_to_index.html>> on Jan. 22, 2014, 2 pages.
Xu et al., "Using Social Annotations to Improve Language Model for Information Retrieval", Proceedings of the Sixteenth ACM Conference on Information and Knowledge Management, Nov. 6-8, 2007, Lisboa, Portugal, pp. 1003-1006, 4 pages.
Yeh, Mi-Yen, "Clustering over Multiple Data Streams", published Oct. 28, 2007, retrieved at <<http://www.iis.sinica.edu.tw/~miyen/research.html>> on Jan. 13, 2010, 4 pages.
Zaman, Tauhid R., "Information Extraction with Network Centralities: Finding Rumor Sources, Measuring Influence, and Learning Community Structure", Massachusetts Institute of Technology, Sep. 2011, 154 pages.
Zhou, Liang and Eduard Hovy, "On the Summarization of Dynamically Introduced Information: Online Discussions and Blogs", AAAI Symposium on Computational Approaches to Analysing Weblogs AAAI-CAAW, 2006, 6 pages.
Zhu et al., "Tag-Oriented Document Summarization", Proceedings of the 18th International Conference on World Wide Web, Apr. 24, 2009, Madrid, Spain, pp, 1195-1196, 2 pages.
"InnovationQ—IP.com", retrieved at << https://iq.ip.com/discover>> on Jun. 28, 2015, 7 pages.
Non-Final Office Action mailed Nov. 9, 2012 from U.S. Appl. No. 12/979,232, 21 pages.
Response filed Mar. 6, 2013 to the Non-Final Office Action mailed Nov. 9, 2012 from U.S. Appl. No. 12/979,232, 15 pages.
Examiner Initiated Interview Summary mailed Jul. 1, 2013 from U.S. Appl. No. 12/979,232, 2 pages.
Final Office Action mailed Jul. 8, 2013 from U.S. Appl. No. 12/979,232, 32 pages.
Response filed Oct. 29, 2013 to the Final Office Action mailed Jul. 8, 2013 from U.S. Appl. No. 12/979,232, 11 pages.
Applicant-Initiated Interview Summary mailed Oct. 29, 2013 from U.S. Appl. No. 12/979,232, 3 pages.
Non-Final Office Action mailed Nov. 15, 2013 from U.S. Appl. No. 12/979,232, 39 pages.
Response filed Feb. 5, 2014 to the Non-Final Office Action mailed Nov. 15, 2013 from U.S. Appl. No. 12/979,232, 14 pages.
Final Office Action mailed Jun. 10, 2014 from U.S. Appl. No. 12/979,232, 32 pages.
Response filed Sep. 9, 2014 to the Final Office Action mailed Jun. 10, 2014 from U.S. Appl. No. 12/979,232, 13 pages.
Notice of Allowance mailed Dec. 19, 2014 from U.S. Appl. No. 12/979,232, 16 pages.
Notice of Allowance mailed Mar. 26, 2015 from U.S. Appl. No. 12/979,232, 10 pages.
Notice of Allowance mailed Jul. 6, 2015 from U.S. Appl. No. 12/979,232, 8 pages.
Notice of Allowance mailed Oct. 23, 2015 from U.S. Appl. No.12/979,232, 7 pages.
Non-Final Office Action mailed Dec. 21, 2012 from U.S. Appl. No. 12/942,577, 31 pages.
Response filed May 21, 2013 to the Non-Final Office Action mailed Dec. 21, 2012 from U.S. Appl. No. 12/942,577, 17 pages.

(56) References Cited

OTHER PUBLICATIONS

Final Office Action mailed Jul. 31, 2013 from U.S. Appl. No. 12/942,577, 36 pages.
Response filed Nov. 14, 2013 to the Final Office Action mailed Jul. 31, 2013 from U.S. Appl. No. 12/942,577, 17 pages.
Non-Final Office Action mailed Dec. 19, 2013 from U.S. Appl. No. 12/942,577, 30 pages.
Response filed Mar. 11, 2014 to the Non-Final Office Action mailed Dec. 19, 2013 from U.S. Appl. No. 12/942,577, 17 pages.
Applicant-Initiated Interview Summary mailed Apr. 4, 2014 from U.S. Appl. No. 12/942,577, 4 pages.
Notice of Allowance, Examiner-Initiated Interview Summary, and Office Action Appendix mailed Aug. 27, 2014 from U.S. Appl. No. 12/942,577, 43 pages.
Notice of Allowance mailed Apr. 7, 2015 from U.S. Appl. No. 12/942,577, 50 pages.
Notice of Allowance mailed Jan. 12, 2016 from U.S. Appl. No. 12/972,577, 33 pages.
Non-Final Office Action mailed May 22, 2014 from U.S. Appl. No. 13/733,009, 33 pages.
Response filed Sep. 22, 2014 to the Non-Final Office Action mailed May 22, 2014 from U.S. Appl. No. 13/733,009, 33 pages.
Final Office Action mailed Jan. 27, 2015 from U.S. Appl. No. 13/733,009, 24 pages.
Response filed Jun. 25, 2015 to the Final Office Action mailed Jan. 27, 2015 from U.S. Appl. No. 13/733,009, 14 pages.
European Search Report and Opinion mailed Jul. 20, 2016 from European Patent Application No. 13822074.4, 8 pages.
Communication pursuant to Rules 70(2) and 70a(2) EPC mailed Aug. 5, 2016 from European Patent Application No. 13822074.4, 1 page.
Response filed Sep. 19, 2016 to the Communication pursuant to Rules 70(2) and 70a(2) EPC mailed Aug. 5, 2016 from European Patent Application No. 13822074.4, 12 pages.
Cai et al., "MASS: a Multi-fAcet domain-Specific influential blogger mining System," 26th International Conference on Data Engineering (ICDE), Mar. 1, 2010, 4 pages.
Preliminary Amendment filed Dec. 21, 2015 from U.S. Appl. No. 14/977,030, 4 pages.
Preliminary Amendment filed Jan. 13, 2016 from U.S. Appl. No. 14/977,030, 8 pages.
Notice of Non-Compliant Amendment mailed Apr. 7, 2016 from U.S. Appl. No. 14/977,030, 3 pages.
Preliminary Amendment filed Apr. 15, 2016 from U.S. Appl. No. 14/977,030, 8 pages.
Notice of Allowance mailed Jul. 7, 2015 from U.S. Appl. No. 13/733,009, 7 pages.
Notice of Allowance mailed Oct. 29, 2015 from U.S. Appl. No. 13/733,009, 35 pages.
International Search Report and Written Opinion mailed Aug. 13, 2014 from PCT Patent Application No. PCT/US2013/078394, 10 pages.
International Preliminary Report on Patentability mailed Jul. 7, 2015 from PCT Patent Application No. PCT/US2013/078394, 6 pages.
Non-Final Office Action mailed Sep. 12, 2014 from U.S. Appl. No. 13/733,034, 45 pages.
Response filed Mar. 11, 2015 to the Non-Final Office Action mailed Sep. 12, 2014 from U.S. Appl. No. 13/733,034, 34 pages.
Final Office Action mailed Aug. 14, 2015 from U.S. Appl. No. 13/733,034, 60 pages.
International Search Report & Written Opinion mailed Oct. 31, 2014, from PCT Application No. PCT/US2013/078395, 12 pages.
International Preliminary Report on Patentability mailed Jul. 7, 2015 from PCT Patent Application No. PCT/US2013/078395, 8 pages.
Non-Final Office Action mailed on Jul. 1, 2013 from U.S. Appl. No. 13/427,584, 10 pages.
Response filed Sep. 26, 2013 to the Non-Final Office Action mailed Jul. 1, 2013 from U.S. Appl. No. 13/427,584, 11 pages.
Final Office Action mailed Jan. 16, 2014 from U.S. Appl. No. 13/427,584, 9 pages.
Response filed Feb. 10, 2014 to the Final Office Action mailed Jan. 16, 2014 from U.S. Appl. No. 13/427,584, 11 pages.
Non-Final Office Action mailed Mar. 14, 2014 from U.S. Appl. No. 13/427,584, 10 pages.
Response filed May 30, 2014 to the Non-Final Office Action mailed Mar. 14, 2014 from U.S. Appl. No. 13/427,584, 11 pages.
Final Office Action mailed Jun. 19, 2014 from U.S. Appl. No. 13/427,584, 9 pages.
Response filed Sep. 19, 2014 to the Final Office Action mailed Jun. 19, 2014 from U.S. Appl. No. 13/427,584, 11 pages.
Non-Final Office Action mailed Oct. 6, 2014 from U.S. Appl. No. 13/427,584, 10 pages.
Response filed Jan. 6, 2015 to the Non-Final Office Action mailed Oct. 6, 2014 from U.S. Appl. No. 13/427,584, 13 pages.
Supplemental Amendment filed Feb. 24, 2015 to the Non-Final Office Action mailed Oct. 6, 2014 from U.S. Appl. No. 13/427,584, 12 pages.
Final Office Action and Examiner-Initiated Interview Summary mailed Apr. 6, 2015 from U.S. Appl. No. 13/427,584, 14 pages.
Response/Amendment filed Jul. 9, 2015 to the Final Office Action mailed Apr. 6, 2015 from U.S. Appl. No. 13/427,584, 11 pages.
Notice of Allowance and Applicant-Initiated Interview Summary mailed Aug. 21, 2015 from U.S. Appl. No. 13/427,584, 10 pages.
Restriction Requirement mailed Mar. 13, 2012 from U.S. Appl. No. 12/753,909, 7 pages.
Response filed Apr. 4, 2012 to the Restriction Requirement mailed Mar. 13, 2012 from U.S. Appl. No. 12/753,909, 9 pages.
Non-Final Office Action mailed Apr. 18, 2012 from U.S. Appl. No. 12/753,909, 13 pages.
Amendment and Response filed Jul. 17, 2012 to the Non-Final Office Action mailed Apr. 18, 2012 from U.S. Appl. No. 12/753,909, 8 pages.
Notice of Allowance mailed Aug. 1, 2012 from U.S. Appl. No. 12/753,909, 5 pages.
Restriction Requirement mailed Dec. 28, 2011 from U.S. Appl. No. 12/691,145, 5 pages.
Response filed Jan. 6, 2012 to the Restriction Requirement mailed Dec. 28, 2011 from U.S. Appl. No. 12/691,145, 1 page.
Non-Final Office Action mailed Mar. 5, 2012 from U.S. Appl. No. 12/691,145, 11 pages.

* cited by examiner

SOCIAL MEDIA IMPACT ASSESSMENT

CROSS-REFERENCE TO RELATED APPLICATIONS

This patent application is a continuation of, and claims priority to, U.S. patent application Ser. No. 13/733,009 filed on Jan. 2, 2013, which is incorporated herein by reference in its entirety.

BACKGROUND

Social media allows users to connect with like-minded people or to connect with people providing information and opinions of interest to the user. For example, TWITTER is a social media platform that allows users to send short messages, called "tweets," to other users. Users tweet about many topics, some personal and some related to business, products or politics, for example. The tweets from any sender are electronically distributed to select other users based on preferences of those other users, who may be said to "follow" the sender.

Sometimes, followers of a user pass on information from that user to other users. The information may be passed on as a retransmission of a message from that user. Retransmission is sometimes said to be a "retweet." Though, the information may be passed on in a new message, which may be correlated with the original message because it may mention the user who originated the message.

It has been recognized that some users of social media are of more interest to others, and may have more followers than others have. Accordingly, the "follower count" of a user, representing the number of followers that user has, is a metric that is sometimes tracked. The follower count has also been called "influence" of a user. To support identifying users with large "follower count," a social network platform may maintain logs of messages sent by users. These logs, sometimes called "tweet logs," may be made available for others to analyze and possibly identify users with high follower count. Though, analyzing this information has been problematic because of the large number of tweets and, therefore, the large amount of the data set to be analyzed.

This follower count is important for those seeking to distribute messages—which may be commercial messages—through social media. Accordingly, advertisers may focus their messages on users of social media with large follower counts in the hope that the user will initiate a favorable message that will ultimately reach a large number of that user's followers.

Using this information, trends have been derived from social media tweets. For example, by identifying users with high follower counts, and determining the topics of their tweets, information about topics of interest to users of the social media platform have been identified.

It is also known to compute for users of social media a metric indicative of the "authority" of the user. The authority of a user has been computed based on traffic statistics relating to messages sent through the social media platform.

SUMMARY

The inventors have recognized and appreciated the value of a topic-based impact score for a user of social media. The inventors have also recognized and appreciated techniques for generating such an impact score. Such an impact score may be computed based on a power metric in combination with an authority metric for a user. Either or both of these metrics may be topic based, such that a user may have different impact for different topics. An impact score computed in this way may be used in any of a number of ways, such as to select users with a high impact with respect to a topic who will be sent advertisements or special offers or otherwise be contacted in relation to that topic. In other scenarios, those with a high impact score may be contacted to obtain their opinions, such as for market research. In other scenario, a user with high impact with respect to a topic may be monitored after an event related to that topic. The messages sent by that user may serve as a predictor for how others in a social network, or some larger group, will respond to an event. Though, the information may be used in any suitable way, including by presenting metrics through a graphical user interface to make them available to an analyst or other interested person.

Accordingly, in some embodiments, the invention relates to a system that includes a processing device and a storage device storing computer-executable instructions. When the instructions are executed by the processing device, the instructions can cause the processing device to access records of messages sent or received by a plurality of users. The instructions can cause the processing device to determine a power of a user to reach other users based at least in part on the messages. The instructions can cause the processing device to determine an authority of the user on a topic based at least in part on counts of forwarded messages authored by the user on the topic. The instructions can also cause the processing device to compute an impact score that reflects both the power and the authority of the user on the topic and, based at least in part on the impact score, contact the user in relation to the topic.

In another aspect, the invention relates to a system that includes a processing device and a storage device storing computer-executable instructions. When the instructions are executed by the processing device, the instructions can cause the processing device to process at least a portion of the messages to compute a power score reflecting a number of followers of an individual user and an authority score reflecting a number of forwarded messages on a topic that are authored by the individual user. The instructions can cause the processing device to compute an impact score of the individual user relating to the topic and based at least in part on the power score and the authority score. The instructions can also cause the processing device to provide a graphical representation of the impact score of the individual user responsive to receiving a selection of the individual user.

In yet another aspect, the invention relates to a method implemented by a computing device that can determine counts of messages that relate to a topic and meet criteria relating to users that sent or received the messages. The method can compute knowledge scores based at least in part on the counts, and compute power scores reflecting power of the users to reach other users. Based at least in part on the knowledge scores and the power scores, the method can determine impact scores related to the topic. The method can also provide an individual impact score of the individual user responsive to receiving a selection of the individual user.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
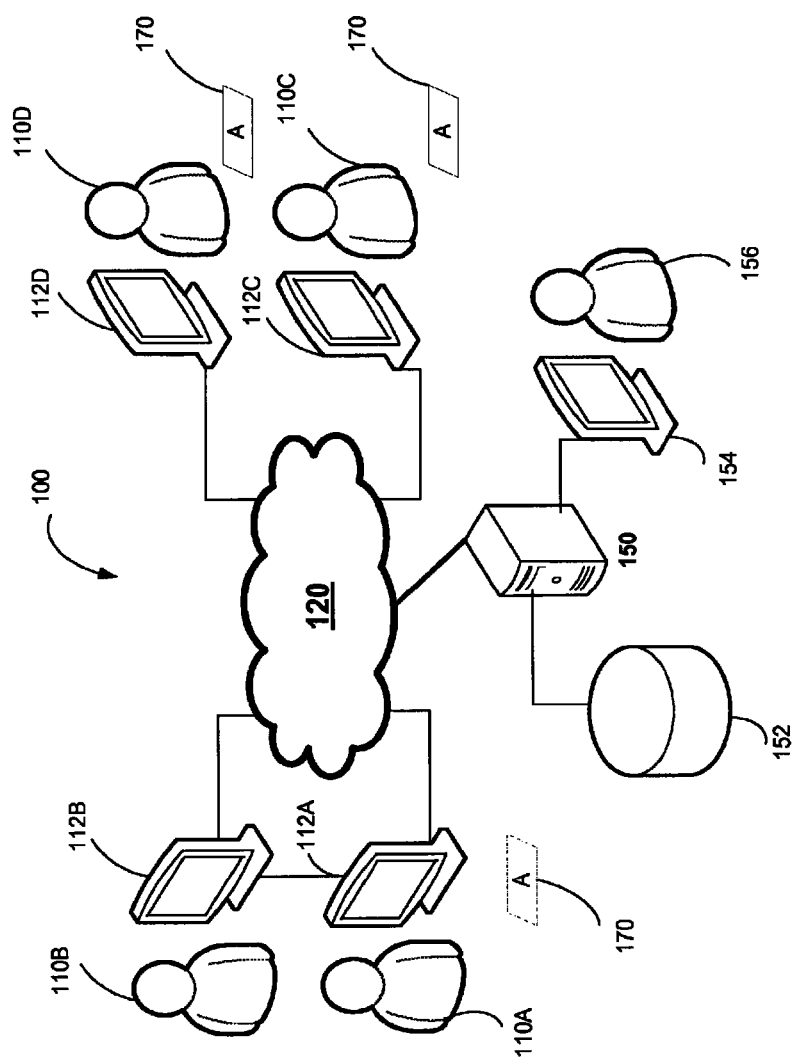
FIG. 1A is a conceptual sketch of a social media platform in operation in a first scenario.

The inventors have recognized and appreciated shortcomings of existing approaches to identifying influential users of social media platforms, and have developed alternative metrics that may more accurately identify influential users. For example, follower count and a "page rank" computation based on number of subsequent references to a tweet have been used to assess influence. Though useful in some scenarios, the inventors have recognized that these approaches are subject to producing misleading results in other scenarios. Follower count, for example, may produce a skewed result when a celebrity user with many followers is evaluated. Similarly, a metric based on page rank may produce inaccurate results in scenarios in which tweets are being sent about a current event for which there has not been sufficient time for there to be a meaningful number of subsequent references to messages about the event.

Moreover, the inventors have recognized and appreciated that influence may reflect one or more factors, including authority of a user making tweets and the power of that user's tweets. The power may relate to the number of followers of the user and/or the number of other users to which messages from the user are retweeted. An indication of a user's authority and/or power may be more accurate if based on a specific topic.

Further, the inventors have recognized and appreciated techniques for allowing influence metrics to be computed simply while nonetheless yielding accurate results. Such techniques may be amenable to computation using MapReduce techniques so that computations on a large data set, such as a twitter log, may be simply broken up for processing on many different computing devices. Accordingly, the computations may be based on counting events, or other simple functions, that may be performed by processing entries of a twitter log separately for each of a number of users about which data may have been collected. In this way, portions of a twitter log may be processed quickly in parallel on multiple different computing devices, and the results of that processing may then be brought together as to compute an overall metric. Moreover, processing per user may alternatively or additionally be easily allocated to different computing devices for parallel computation.

The analysis techniques as described herein may be applied for any suitable type of social media. An exemplary system for analyzing social media data as described herein uses terminology applicable to TWITTER, a widely used social media platform. Such terminology may be readily recognizable to those of skill in the art because the TWITTER platform is well known. However, it should be appreciated that the systems, methods and apparatus for analyzing social media data are applicable to other social media platform and use of terminology suggestive of the TWITTER platform does not limit applicability of the invention to the TWITTER platform.

For example, as used herein, a "tweet" may encompass any message distributed through a social media platform. In other social media platform, a short message might be called a post or might be described as "writing on a wall," or given some other name. Nonetheless, all of these forms of communication may be regarded as "tweets." Likewise, a "tweet log" may encompass any collection of information about messages, whether sent using the TWITTER platform or other social media platform. Further, regardless of the format in which the original message is presented, any action re-affirming or de-affirming that message for others in a social network may be regarded as a "retweet." In a platform such as FACEBOOK, for example, an action called "like" or "dislike" can correspond to a retweet. In other platforms, the corresponding retweet function may be called "forward" or "recommend."

Accordingly, the concepts described herein may apply to any social media platform regardless of how denominated. The specific terminology used to describe the mechanisms by which messages are communicated, or re-communicated, is not a limitation on the invention. For example, social media platforms as described herein are sometimes called "microblogs." Users of these systems are sometimes called "prosumers" reflecting a common use of a social media platform in which a consumer of content may also produce content. The techniques as described herein are applicable to any platform supporting such microblogs.

FIG. 1A provides an example and a social media platform 100. In this example, users 110 A, 110 B, 110 C and 110 D are illustrated. Each of the users has a computing device 112 A, 112 B, 112 C or 112 D, respectively, connected to a network 120. The computing devices may have any suitable form. For example, a user may access a social media platform through a desktop computer, a tablet, a smart phone or other portable computing device. Regardless of the type of computing device, each of the computing devices may have installed on it an application or otherwise be configured for accessing the social media platform. However, the specific mechanism by which a user accesses the social media platform is not critical to the invention, and access to the social media platform may be performed using techniques as are known in the art.

Network 120 may be any suitable network. In the examples provided herein, users of the social media platform are connected through a wide area public network, such as the Internet.

Social media platform 100 may contain servers or other devices also connected to network 120 routing messages among users of social media platform 100. In this example, server 150 is shown connected to network 120 for this purpose. Server 150, or other suitable components in the social media platform, may, for each message sent by a user, determine which other users are to receive that message. Server 150 may then route the message appropriately.

For example, user 110 A may issue a message 170. The content of message 170 may be selected by user 110 A and message 170 may indicate that it was initiated by user 110 A.

Social media platform 100 may be configured to route message 170 to a subset of the users of the social media platform. The users to whom message 170 is routed may depend on relationships between users that were previously defined by those users as part of interacting with the social media platform. Various approaches may be used by a social media platform to determine which users receive which messages. In some social media platforms, for example, the platform supports interaction between users that allow the users to form networks. In such a scenario, a message, when sent by one user, may be made available to other users in the same network.

In some social media platforms, the networks may be mutual such that any message sent by a user is routed to all other users in the same social network. In other social media platforms, messaging need not be mutual. In TWITTER, for example, a user may have "followers." When a user sends a message, the message may be selectively made available to the followers of the sending user. Those followers may be said to be "friends" of the sending user or may be said to "follow" the sending user. Though it is possible, it is not a requirement that sending users also follow all of their followers.

In the example of FIG. 1A, user 110 A is followed by users 110 D and 110 C. Accordingly, each of users 110C and 110 D receives message 170. In this example, user 110 B does not follow user 110 A, and user 110 B is not shown directly receiving message 170. However, in the scenario illustrated in FIG. 1B, user 110B follows user 110D, and user 110D re-transmits, or "retweets" message 170 as retweet message 172. Because user 110B follows user 110D, user 110B receives message 170 as a retweet message 172.

In some embodiments, a retweet message is distinguished from other types of messages based on other messages. For example, user 110C may author a message 174. Message 174 may mention user 110A and possibly refer to or be influenced by content in message 170 or other messages sent by user 110A. However, because message 174 is not a retransmission, but a newly authored message, in some embodiments, it will be classified as a "mention" of user 110A. In those embodiments, message 174 might not be classified as a retweet because it is not a direct copy of message 170.

Figure 1B:
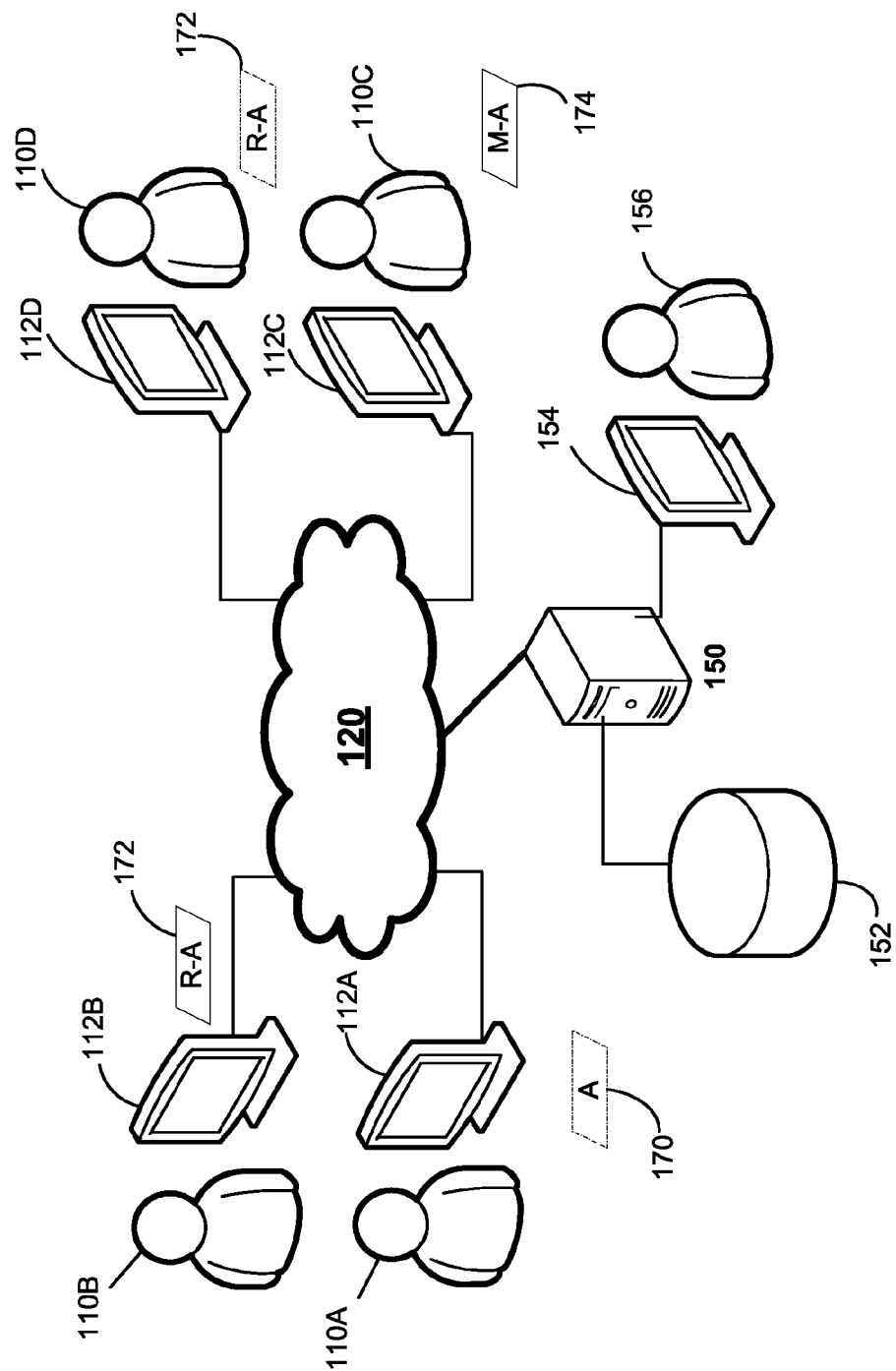
FIG. 1B is a conceptual sketch of a social media platform in operation in a second scenario.

Though not expressly illustrated in FIGS. 1A and 1B, other types of messages may alternatively or additionally exist in a social media platform. For example, "conversational tweets" may exist. In a conversational tweet, a user may reply to a tweet. Such a reply may be sent as a matter of courtesy or as a reflex and may indicate a different level of interest in the content of the original message than a retweet or a mention. Accordingly, conversational tweets, and other types of tweets, may be treated differently in the analysis of authority or impact of a user.

Server 150, or other computing device in the social media platform, may track messages in social media platforms where users have consented to such use of their tweets. In the embodiments illustrated in FIGS. 1A and 1B, server 150 maintains a database 152 in which a record of messages may be maintained. This record, or a processed version of such a record, may be called a "tweet log." The tweet log may be analyzed for one or more purposes for which users have provided consent.

The analysis may be automated and may be performed by server 150 or other suitable computing device. Though, it should be appreciated that analysis of the tweet log need not be performed on a computing device that manages transmission of messages in social media platform 100. In some embodiments, the tweet log may be made available to entities other than the operator of social media platform 100 for analysis.

The analysis may be performed in any suitable way. In some embodiments, the analysis may classify users based on their authority and/or influence with respect to one or more topics. Such classifications may be based on one or more scores that are computed according to algorithms that are designed to have values reflective of the degree to which a user exhibits a desired user characteristic. The degree to which a user exhibits characteristics, such as authority or influence, may be inferred from behavior of users of the social network and the algorithms may be based on metrics indicative of actions of users within the social network.

The results of the analysis may be information that is used in any suitable way. In some embodiments, the analysis may be used to project future attitudes about a topic. For example, by identifying influential users, and observing changes in sentiment, tone or content of their messages on a topic, it may be possible to predict future opinions of larger numbers of users. If the topic of the message is a product, such a capability to predict future opinions may be useful for marketing. If the topic of the message is a political subject, such a capability may be useful for developing a political campaign. Though, it should be appreciated that marketing and politics are only examples, and any suitable use of the analysis may be made.

As another example, the results of the analysis may result in selection of users to be contacted. For example, an authoritative user with respect to a topic may be contacted and invited to write a blog post on the topic. Alternatively or additionally, an influential user with respect to a topic may be contacted and offered a position as a spokesperson for a product or requested to make an endorsement of a product related to the topic. Such a request may be made directly, such as by offering the selected user a job as a spokesperson for the product, or indirectly, such as by offering the influential user free or discounted access to the product.

Regardless of how the analysis is performed and the results of that analysis used, the analysis alternatively or additionally may be performed manually. Accordingly, FIGS. 1A and 1B illustrate analyst 156 accessing database 152 via computing device 154. Computing device 154, instead of or in addition to computing scores for user characteristics such as authority and influence, may provide a display on which a user interface may be presented. The user interface may provide information about one or more users. Examples of user interface that may be displayed are shown below in FIGS. 5A and 5B, discussed below.

It should be appreciated that social media platform 100 is greatly simplified in FIGS. 1A and 1B for purposes of illustration. The techniques described herein may be applicable to social media platforms of much greater complexity. For example, though only four users are illustrated, a social media platform may support thousands, tens of thousands, millions or more of users. Accordingly, systems as described herein may be scaled to any number of users. As a specific example, though analysis of a tweet log is illustrated as being performed on a single computing device, server 150 in this example, the analysis algorithms as described herein may be distributed across multiple computing devices. Likewise, though database 152 is illustrated in a single location, it should be appreciated that a distributed database, with multiple nodes in multiple locations may be used.

Computations on such large datasets may be performed in any suitable way. However, owing to the large population of users of some social media platform, some embodiments may employ a software framework known as "map-reduce." Generally, use of a map-reduce framework involves partitioning an input dataset into multiple shards, using a separate "map" process to apply a user-defined algorithm to each shard, and then using one or more "reduce" processes to consolidate the results generated by all of the map processes across all of the shards of the dataset. Generally, a map-reduce framework enables certain steps of a procedure (e.g., those performed by map processes) to be performed in parallel, thus allowing the procedure to be performed on significantly larger datasets than those which computers deployed differently can handle, and increasing the likelihood of recovering from partial failure during execution. In some embodiments, a dataset reflecting relationships between users of a social media platform may be partitioned into discrete shards, one or more power iteration algorithms may be applied by a map process to each shard, and one or more reduce processes may consolidate the results generated to determine the user(s) who are influential within the overall community of users.

Figure 2:
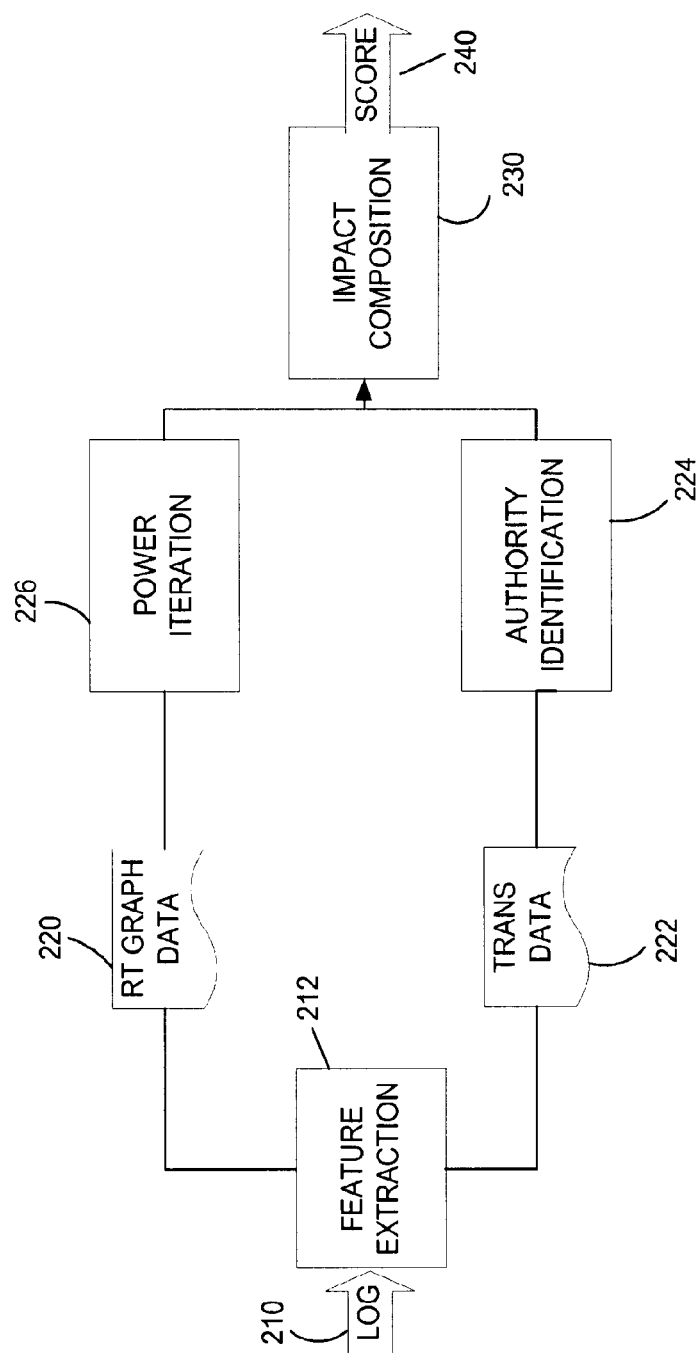
FIG. 2 is a functional block diagram of an exemplary embodiment of a method of computing an impact score for one or more users of a social media platform.

Regardless of the specific educational techniques employed, values indicative of the impact of one or more users may be computed. FIG. 2 illustrates an example of analysis that may be performed to determine impact, and other scores, for one or more users of a social media platform.

Impact Composition

FIG. 2 illustrates an approach to determining a score indicative of the impact of one or more users of a social media platform. FIG. 2 is a functional block diagram of processing to implement analysis techniques on a log of messages, such as may be obtained from database 152 (FIG. 1B).

The processing depicted in FIG. 2 may be performed in any suitable computing device or devices. In some embodiments, processing to perform the analysis of FIG. 2 may be performed in multiple computing devices. Those devices may be programmed using map reduce primitives such that portions of the analysis are performed in parallel in multiple computing devices.

In the example of FIG. 2, processing begins on a log 210. Log 210 may be a computerized store of information about messages communicated in a social media platform. As an example, these messages may be tweets communicated through the TWITTER social media platform. However, these messages may be posts in the FACEBOOK social media platform or any other suitable type or combination of types of messages.

In this example, log 210 may be processed to generate one or more processed logs for further analysis. In this example, log 210 is initially processed in feature extraction process 212. In feature extraction process 212, a log file containing messages sent over a relevant time interval is accessed. The relevant time interval may depend on the nature of the analysis to be performed and/or the amount of data in a log file. For example, in some embodiments log files may be generated to cover periodic intervals, such as hours or days. For analysis over these time periods, the entire log file may be processed. In other embodiments, analysis may be performed to support identification of trends. In those embodiments, analysis may be repeatedly performed on message data relating to a shorter interval that is contained in the log file. For example, a log file may contain a record of messages sent during an entire day, but the data may be analyzed as 24 separate chunks, each representing messages sent during one hour. Quickly, the amount of data analyzed from log 210 is not critical to the invention.

Any suitable processing may be performed as part of feature extraction process 212. In some embodiments, feature extraction may be performed to suppress duplicate records of a message. Other processing may extract information from the messages. In some embodiments, the extracted information, rather than the original content of the messages may be maintained.

The extracted information, for example, may indicate a topic of the message. Topic may be extracted in any suitable way, such as by identifying in a message one or more words or other symbols relating to a topic of interest. In some embodiments, topics of interest may be predefined by a user of an analysis system performing the processing of FIG. 2. In such a scenario, symbols associated with topics of interest may also be predefined. In other scenarios, however, clustering analysis or other approaches may be used to identify topics reflected in the messages in log 210.

In some embodiments, messages with no identified topic may be discarded as part of a feature extraction process 212. Other criteria may alternatively or additionally be used to exclude messages from further processing.

For messages that are not excluded, an indication of a sentiment of each message may be extracted. Sentiment may be determined by parsing the content of each message into individual terms or other symbols and counting the number of symbols reflecting a positive or negative sentiment. In some embodiments, the terms expressing a sentiment may be universally applicable and known in advance. Terms such as "like" and "want" or "dislike" and "terrible" may be known to indicate a positive or negative sentiment, respectively, and may be preprogrammed into the system implementing the processing of FIG. 2.

Regardless of the specific symbols considered to reflect a sentiment, in some embodiments, the number of symbols reflecting a negative sentiment may be subtracted from the number of symbols representing a positive sentiment. The resulting number may be expressed as a frequency and may be used as an indicator of the sentiment of a message. Such a number may indicate a positive, negative or neutral sentiment about a topic of a message.

In the examples used herein, the messages are relatively short. Processing may be simplified by assuming that each message relates to a single topic. Accordingly, the identified terms indicating sentiment may all be assumed to relate to the topic. Though, it should be appreciated that in some embodiments, such as when longer messages are processed, additional processing may be performed to identify symbols indicating sentiment related to the topic.

Figure 3:
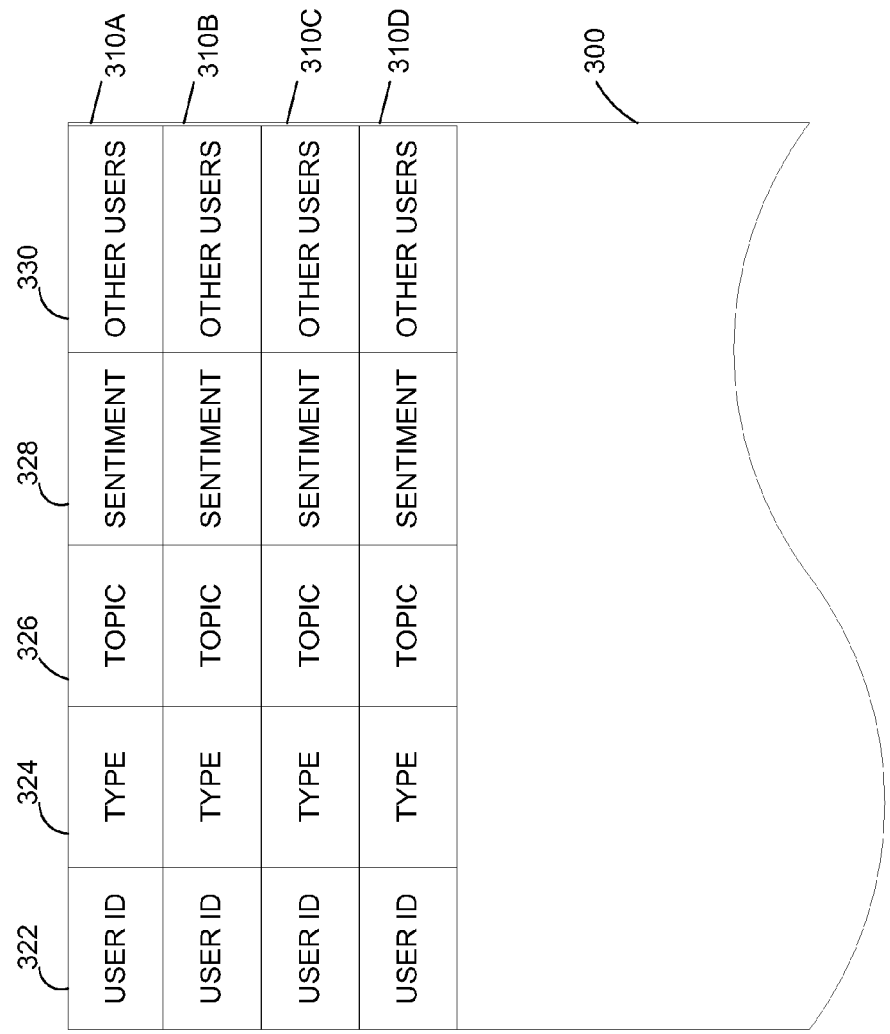
FIG. 3 is a conceptual sketch of a tweet log according to some illustrative embodiments.

FIG. 3 illustrates a processed tweet log 300 that may be derived using feature extraction. Should be appreciated that FIG. 3 is a conceptual sketch of information that may be retained following feature extraction process 212. Though, any suitable information may be extracted and retained for further processing. Likewise, the retained information may be stored in computer readable storage media in any suitable fashion.

In the example of FIG. 3, each unique message retained for further processing is reflected as a row in a database in tweet log 300. In this example, rows 310A, 310B, 310C and 310D are illustrated. However, it should be appreciated that only four rows are illustrated for simplicity and in a real system many more than four messages may be retained after feature extraction process 212.

In this example, five types of extracted information about each message are retained. Each type of information is stored in a separate field in tweet log 300. Taking row 310A as illustrated of rows 310A, 310B, 310C and 310D . . . , fields 322, 324, 326, 328, and 330 are illustrated.

In this example, field 322 contains an identifier of a user that sent the message about which data is retained in the row. Field 324 contains an indication of the type of the message. For example, the message may be categorized, using terminology popularized by the TWITTER social media platform, as an original tweet, a retweet, a mention or a conversational tweet, for example.

Field 326 may contain an identification of a topic detected for the message. The topic may be identified using keywords or other suitable techniques, as described above. Field 328 may contain indication of the sentiment of the message. The sentiment also may be derived as described above or using any other suitable technique. In this example, the sentiment may be positive, negative or zero, representing a positive, negative or neutral sentiment.

Other information used in the analysis as described herein may alternatively or additionally be stored in tweet log 300. In this example, a field 330 stores information about other users mentioned in the message. Though, it should be appreciated that such information may be obtained in any suitable way.

In the embodiment illustrated in FIG. 2, tweet log 300 may be output as transaction data 222. Such data may be used in authority identification process 224. Other data may alternatively or additionally be generated by feature extraction process 212.

In the example of FIG. 2, power iteration processing 226 uses retweet graph data 220.

Retweet graph data 220 may indicate propagation of messages through a network of users of a social media platform. In the example of FIGS. 1A and 1B, for example, message 170 is sent from user 110 A to users 110 D and 110 C. Message 170 is retweeted as retweet message 172 sent to user 110 B. This retweet may be reflected in retweet graph data 220, linking message 170 sent by user 110 A with retweet message 172 received by user 110 B. If retweet message 172 is further retweeted, that additional retweet also may be linked back to original message 170 and original sender user 110 A.

Other messages sent and forwarded by other users likewise may be reflected in retweet graph data 220. Retweet graph data 220 may be generated by feature extraction process 212 or in any other suitable way. These messages may be identified by processing messages in log 210 from oldest to newest, distinguishing between original messages and retweets. Though, retweet graph data 220 may be generated, in any suitable way, including for example, using processing as is known in the art.

In some embodiments, the messages reflected in retweet graph data 220 may be limited to one or more topics of interest as a result of feature extraction process 212. Though, in other embodiments, the retweet graph may be based on messages sent over a time period or selected based on any other suitable criteria.

Regardless of the amount and nature of data generated by feature extraction process 212, that data may be used to compute one or more scores which may, separately or in combination, indicate an impact of one or more users. In the example illustrated in FIG. 2, information from log 210 is used to compute two scores for some or all of the users of the social media platform. In this example, an authority score is computed through authority identification processing 224. A power score is computed through power iteration processing 226. These two scores may then be used as part of impact composition processing 230 to generate an overall impact score 240. Either or both of the authority score and the power score may be topic based, meaning that different scores may be provided for the same user based on their power or authority with respect to different topics. As a result, the impact score 240 may be topic based as well. The inventors have recognized and appreciated that a topic-based impact score may more accurately reflect the impact of a user of a social media platform and may therefore provide a more accurate mechanism for selecting impactful users of the social media platform for market research, marketing or other purposes.

In this example, the power score for a user is an indication of the number of other users historically reached by a message sent by that user. The more times a message sent by a user is retweeted, the greater the power score for that user may be. The authority score for a user may reflect the extent to which a user is regarded as an authority. Authority of the user may be inferred from one or more actions of other users of the social media platform, including the number of times that a user's messages are retweeted or the user is mentioned in messages by those other users. Any suitable approach may be used for computing these scores, examples of which are provided below.

Authority Score

In computing an authority score, a plurality of metrics may be computed. These metrics may include a topical signal, a retweet impact, a mention impact and a network score metric. In some embodiments, each of these metrics may be computed from a tweet log, such as log 210 (FIG. 2), either in unprocessed form or in a processed form such as is represented by transaction data 222. In the embodiment illustrated, each of these metrics may be computed from counts of items in the log.

The counts may include, for example, one or more of the following: number of tweets by the user relating to the topic; number of retweets by the user relating to the topic; total number of tweets and retweets by the user; number of mentions of the user in retweets of other users relating to the topic; number of other users mentioning the user in retweets relating to the topic; number of mentions of other users by the user in tweets relating to the topic; number of other users mentioned by the user in tweets relating to the topic; number of mentions of the user in tweets by other users relating to the topic; number of other users that mentioned the user in tweets relating to the topic; number of followers of the users; and/or number of other users following the user. Such counts may be simply computed. Moreover, such counts may be computed independently of one another, such that each count may be computed in a separate process. As a result, processing to determine the counts may be performed in two or more parallel processors, with each processor computing one or more of the counts.

These counts may then be used to compute metrics, which in turn may be used to compute an authority score. Examples of processing to compute each of the metrics is provided below.

The "topical signal" for a particular topic of interest may be defined as:

$$TS = OT1/(NT - RT1), \text{ where:}$$

OT1: number of tweets the author sent with respect to the topic

RT1: number of retweets the author retweeted with respect to the topic

NT: total number of tweets and retweets the author sent, which is OT1+RT1 if all tweets the author sent are w.r.t this topic, otherwise, NT=max(OT1+RT1, MISC−MXSC+1), where MISC and MXSC are minimal status count and maximal status count, respectively, which tell the total number of tweets the user sent for all topics.

It should be noted that the "topical signal" may have different values for different topics such that the analysis described herein may be performed once for each topic of interest. It also should be noted that the "topical signal" may have different definitions for different phases of the analysis. For example, in computing the Power Score, as described below, the Topical Signal may be defined as TS=(OT1+CT1+RT1)/NT, where CT1 is the number of conversational tweets. Without being bound by any particular theory, CT1 is not used in this embodiment of computing an authority score because the inventors theorize that conversational tweets have negligible connection to the authority score computation, but are used for filtering out the non-authority users. In addition, the definition of topical signal used to compute the authority score puts greater emphasis on original tweets. It is easy to see that TS=0 if OT1=0, no matter how many retweets the user sent. Other metrics may alternatively or additionally have different definitions for different phases of the computation. The network score (NS) defined may also be different. As defined for computing an authority score, NS can be computed directly from the tweet log with no dependency on follower graph or any other data source.

Though, it should be appreciated that some or all of the definitions for authority score may alternatively or additionally be applied for other phases of the computation. For example, the definition of RT1 and RT3 as set forth above may be applied in connection with computing the Power Score below. Such an approach, for example may lead to a more concrete computation of Retweet Impact using a more implementable concept, without counting dependent on retweet sequence or timestamp. However, the specific definition is not critical to the invention.

The Retweet Impact may be computed according to a formula:

RI=RT2·log(RT3) where

RT2: number of mentions of the author from others' retweets with respect to topic
RT3: number of other users mentioning the author in retweets with respect to topic Mention Impact may be computed according to a formula:

MI=$M3$·log($M4$)−$M1$·log($M2$) where

M1: number of mentions of others by the author with respect to topic
M2: number of others mentioned by the author with respect to topic
M3: number of mentions of author by others with respect to topic
M4: number of others mentioning the author with respect to topic Network Score may be computed according to a formula:

NS=log($G1$+1)−log($G2$+1) where

G1: number of topical active retweet users retweeted after the author with respect to topic.

G2: number of topical active retweet users retweeted before the author with respect to topic.

These metrics, when computed for a user, may be regarded as "features" of the user. In some embodiments, an authority score may be computed for the user based on a comparison of the features of the user to the other users within a population, such as the population of users within a social network or the general population of users of a social media platform. In some embodiments, that comparison may be based on the rank of that user within the population of users under consideration.

For simplicity of computation, the rank may be approximated based on a model of a cumulative distribution function for users of the group. The value of the cumulative distribution function corresponding to the value of the features for a user may indicate the rank of the user. In an embodiment in which multiple features are used to characterize each user, the cumulative distribution function may be a multivariate function of the multiple features. Though, a further simplification may be to represent the multivariate cumulative distribution function as a combination of single variable functions, each corresponding to one feature. For example, the multivariate cumulative distribution function may be modeled as the product of multiple single variable functions.

As a specific example, for a user with the above features with respect to a topic, the topical authority score may be computed based on the rank of that user's features within a distribution of feature values within the relevant population. For example, the topical authority score may be the value of the following normal or Gaussian cumulative distribution function (CDF):

$$AS = \prod_{f=TS,RI,MI,NS} \left[ \int_{-\infty}^{x_f} N(x; \mu_f, \sigma_f) dx \right]^{w_f}$$

Where:
$N(x; \mu_f, \sigma_f)$: normal or Gaussian probability density function, computed based on statistics of the population for the relevant feature value.

TS, RI, MI and NS are Topical Signal, Retweet Impact, Mention Impact, and Network Score, respectively, which are defined above.

$\mu_f$: the mean value of feature f for all users with respect to the topic
$\sigma_f$: the standard deviation (SD) value of feature f for all users with respect to the topic
$w_f$: the weight assigned to the feature f, which is a constant for all topic and all users In some embodiments a topical authority score may be computed on multiple processors, and such computation may be allocated among the processors using a MapReduce (M-R) algorithm. In some embodiments, the M-R algorithm may contain two M-R processes. But it is worth to mention that there may be front end pre-processes before these processes, which translate each Twitter raw log record into a Tweet Full Data object, and remove redundant log records. Doing this, the input data set ingested by every middleware component (such as individual algorithm) may be golden with no duplicates. The following subsections present pseudo-code to describe Feature Extraction and Authority Computation MapReduce primitives. There are two operators used in the code ← : assignment operator - assigning the right hand value (RH) to the left hand (LH) variable
←+ : addition operator - adding object to a map container), as described below.

Additional computational steps, such as user value merging, user value to authority metrics transformation, mean and standard deviation calculation, and accumulation function implementations are described separately below to keep the content concise and focused.

FEATURE EXTRACTION PSEUDO-CODE

```
1:      class Topic User key
2:          member topic
3:          member uid - user id
1:      class Topic User Value
2:          member OT1 - original tweet count
3:          member RT1 - retweet count
5:          member misc - min status count
6:          member mxsc - max status count
8:          member mu1 - map for users mentioned by this user
9:          member mu2 - map for users retweet followed by this user
10:         member mu3 - map for users retweet mentioned by this user
11:         member mu4 - map for users mentioning this user
12:         member mu5 - map for users retweet following this user
13:         member mu6 - map for users retweet mentioning this user
Input: set of pairs (tweet key, tweed full data)
Output: set of pairs (topic user key, topic user value)
1:      class Feature Extraction Mapper
2:          create user key object k
3:          create a user map object u (with entry<user id, user value>)
3:          method map(tweet full data x)
4:              create topic user value object v
5:              u ←+(x.userId, v)
5:              if x is retweet
7:                  v.RT1 ← 1
8:                  for each uid in the list of users retweeted followed
9:                      v.mu2 ←+(uid, 1)
10:                     create a topic user value t
10:                     t.uid ← uid
11:                     t.mu5 ←+(x.userId, 1)
12:                     u ←+(uid, t)
13:                 for each uid in the list of users retweeted mentioned
14:                     v.mu3 ←+(uid, 1)
15:                     create a topic user value t
16:                     t.uid ← uid
17:                     t.mu6 ←+(x.userId, 1)
18:                     u ←+(uid, t)
18:             else
19:                 v.OT1 ← 1
20:                 for each uid in the list of users mentioned
21:                     v.mu1 ←+(uid, 1)
22:                     create a topic user value t
23:                     t.uid ← uid
24:                     t.mu4 ←+(x.userId, 1)
25:                     u ←+(uid, t)
26:             for each topic in the list of topics w.r.t this tweet
27:                 k.topic ← topic
27:                 for each entry e in the map u
28:                     k.uid ← e.key
29:                     emit(k, e.value)
30:                 clear u
1:      class Authority Metrics
2:          member count - used for user count with respect to the topic
3:          member ts - topical signal
4:          member ri - retweet impact
5:          member mi - mention impact
6:          member ns - network score
7:          member ts2 - standard deviation value with respect to TS feature
8:          member ri2 - standard deviation value with respect to RI feature
9:          member mi2 - standard deviation value with respect to MI feature
10:         member ns2 - standard deviation value with respect to NS feature
Input: set of pairs (topic user key, list of topic user values)
Output: set of pairs (topic user key, authority metrics)
1:      class Feature Extraction Reducer
2:          create authority metrics z accumulating metrics with respect to a topic
3:          create authority metrics m as the emit value
4:          create user value y for merge instances with respect to a user
5:          create topic user key kz for z
6:          method reduce(topic user key k, list of user values xs)
7:              if kz.topic = null
8:                  kz.topic ← k.topic
9:                  kz.uid ← empty string
10:             else if kz.topic ≠ k.topic
11:                 compute topic mean and SD using z, and store result to z
12:                 emit (kz, z)
13:                 kz.topic ← k.topic
14:                 clear z
15:             z.count ← z.count + 1
16:             for each x in xs
17:                 merge user value y with x and store result to y
18:                 compute metrics using y and store the result to m
19:                 accumulate m with z and store the result to z
20:                 emit(k, m)
21:                 clear y
22:         method cleaup( )
23:             average(z)
24:             emit(kz, z)
```

Authority Computation Pseudo-Code

In this phase, we do not need to implement the mapper, but use a default mapper class, which will ingest each key-value pair (i.e. topic user key-authority metrics in our case) and emit it to the reducer. However, we do need a specific group key partitioner and a specific group key comparator for topic user key such that all users with respect to one specific topic will be sent to the same reducer instance as an inseparable group and ordered by the second key—user ID. As such, it is ensured that each reducer instance will be able to process a topic set of users one by one and the first one for each topic is really the mean and standard deviation value object, since we set the secondary key value (uid of topic user key) to empty on purpose in the previous M-R process. Standard functionality for each MapReduce framework may be applied for these operations. Though, these operations may be performed in any suitable way.

```
Input: set of pair (topical user key, authority metrics)
Output: set of pair (topic, (user id, authority score))
1:      class Authority Computation Reducer
2:          load weight vector w from configuration properties
2:          method reduce(topic user key k, list of authority metrics ms)
4:              μ ← ø
5:              σ ← ø
6:              for each m in ms
7:                  if μ = ø
8:                      μ ← the mean vector stored in m
9:                      σ ← the standard deviation vector stored in m
```

```
11:        else
12:            pvale ← Gaussian CDF(m;µ;σ,w)
13:            emit(k.topic, (k.uid, pvalue))
```

The Gaussian CDF is a standard math function and may be computing using a program obtained from any suitable source, including the Microsoft Infer.NET library.

Figure 4:
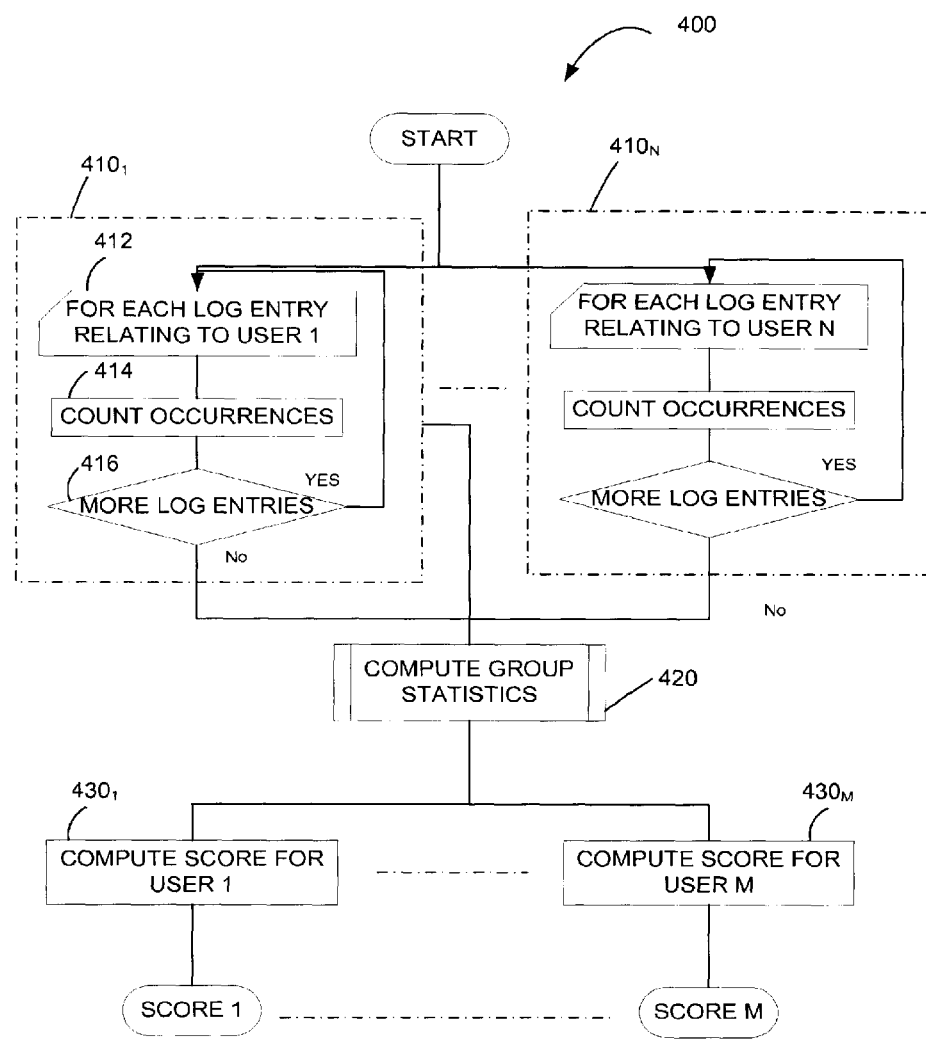
FIG. 4 is a flowchart of an exemplary method of computing an authority score for one or more users of a social media platform.

Turning to FIG. 4, a method 400 of implementing processing to compute authority scores for each of a plurality of users is illustrated. Method 400 is shown to contain multiple sub processes, each of which may be performed on a separate processor, allowing authority scores to be computed in parallel. Though, it should be appreciated that, in some embodiments, each of the sub processes illustrated in method 400 need not be performed on a separate computing device. In some embodiments, a single computing device or single processor may perform multiple ones of the sub processes illustrated for method 400. Alternatively or additionally, in some embodiments a sub process may be performed on multiple computing devices or processors.

In this example, processing begins with multiple sub processes $410_1 \ldots 410_N$. Each of the sub processes $410_1 \ldots 410_N$ may be performed for a different user of a social media platform. It should be appreciated that processing may be performed for a subset of the users of the social media platform such that a sub process need not be performed for all users. Nonetheless, once a relevant subset of users is identified, processing may entail a sub process for each of the users in the subset.

In the embodiment illustrated, similar processing is performed in each of the sub processes $410_1 \ldots 410_N$. Accordingly, processing in sub process $410_1$ may be representative of processing in the other sub processes, and only sub process $410_1$ is described for simplicity.

In sub process $410_1$, a loop over a log of messages is initiated at loop start 412. This processing may be performed over a log that has been processed, such as transaction data 222 (FIG. 2) or other suitable data store. In this example, the loop is performed for each entry in the log relating to the user. In this sub process, counts, which may be counts as described above, are made. Accordingly, the log entries relating to the user may entail entries describing messages sent by that user or received by the user. Alternatively or additionally, the counts may relate to retweets, such that the log entries relating to the user may include retweets of the users messages or messages mentioning the user.

For each message from the log to be processed, an iteration of the loop is performed. In each iteration, processing proceeds to block 414 where counts are updated based on the message being processed in the loop iteration. The specific counts that are updated may depend on the specific algorithm being executed. However, counts as described above, or any other suitable counts, may be updated as a result of processing at block 414.

After updating the counts based on a message, processing may proceed to decision block 416, wherein the sub process may branch. Processing may loop back to loop start 412 if more log entries remain to be processed. In this way, processing may proceed until all entries relating to the user are processed. When no further log entries remain to be processed, processing may proceed to sub process 420.

When all of the sub processes $410_1 \ldots 410_N$ are completed, sub process 420 may be executed. In sub process 420, the counts computed in each of the sub processes $410_1 \ldots 410_N$ may be combined to generate counts applicable across the subset of users. Alternatively or additionally, statistics may be computed for the group. These statistics may be based on the counts directly. Though, in some embodiments, the statistics may be based on metrics computed from the counts. This processing may be as described above or may be performed in any other suitable way.

Using the group statistics computed in sub process 420, method 400 may continue on to sub processes $430_1 \ldots 430_M$. In each of sub processes $430_1 \ldots 430_M$, authority scores may be computed for each user in a second subset. In some embodiments the second subset of users for which authority scores is computed may be the same as the subset of users for which counts are computed. However, in some embodiments, authority scores may be computed for a different subset of the users than for which counts are computed.

The authority scores computed in sub processes $430_1 \ldots 430_M$ may be computed in any suitable way, including using techniques as described above.

Topical Power Score

A power score for a user may be obtained in any suitable way. Techniques for identifying influential users may involve performing a process known as "power iteration." Those skilled in the computer programming arts may recognize that power iteration is a known approach to identifying members of a population exhibiting particular characteristics. For example, power iteration techniques are employed by online search engines to determine the order in which pages returned by a search query are to be presented to a user. Such power iteration techniques may be applied to identify users of one or more social networks who are influential within the user community.

In some embodiments, a power score contribution to each user from one or more other users may be determined. This may be performed in any of numerous ways. In embodiments that employ a map-reduce framework, one or more map processes may calculate contributions to a particular user from one or more other users within a discrete shard of the population.

In some embodiments, a user receives a power score contribution from other members of the community who have retweeted any of the user's messages. Which users have retweeted other users' messages may be determined form a retweet graph.

Accordingly, Power Iteration may be performed over the retweet graph, which is formulated as $$R(t_i) = \frac{d}{N} + (1-d) \sum_{t_j \in Retweet(t_i)} \frac{R(t_j) w(t_j, t_i)}{|Retweeted(t_j)|}$$

where:

$t_j$—a user to be evaluated.

$R(t_j)$—RetweetRank for the user.

N—cardinality (number of unique twitter users).

d—damping factor, which may be any suitable value and, in some embodiments is set equal to 0.15.

Retweet($t_i$)—users that have retweeted after user $t_i$.

Retweeted($t_j$)—users that user $t_j$ has retweeted after.

$w(t_j, t_i)$—a weight for edge $t_j \rightarrow t_i$ in the retweet graph.

Topical knowledge score defined as a product of weighted Gaussian CDF, to implement a ranking algorithm, as described above in connection with the authority score computation.

$$\text{knowledge score}(KS) = \prod_{f=TS,RI,MI,NS} \left[ \int_{-\infty}^{x_f} N(x; \mu_f, \sigma_f) dx \right]^{w_f}$$

Where $N(x; \mu_f, \sigma_f)$—normal distribution density function for feature f $\mu_f$—mean of all topical authors with respect to feature f
$\sigma_f$—standard deviation of all topical authors with respect to feature f TS—Topical Signal=OT1+CT1+RT1/|#tweets|

OT1: number of original tweets the author sends with respect to the topic
CT1: number of conversational tweets the author sends with respect to the topic
RT1: number of retweets the author sends with respect to the topic
|#tweets|: total number of tweets for all topics the author sends during the period considered RI—Retweet Impact=RT2·log(RT3)

RT2: number of retweet mentions mentioning the author w.r.t the topic
RT3: number of users retweet mentioning the author w.r.t the topic MI—Mention Impact=$M3 \cdot \log(M4) - M1 \cdot \log(M2)$ M1: number of mentions of others by the author with respect to the topic
M2: number of others mentioned by the author with respect to the topic
M3: number of mentions of the author by others with respect to the topic
M4: number of others mentioning the author with respect to the topic NS—Network Score=log(G1+1)–log(G2+1)

G1: the user's follower count
G2: the user's friend count

We define the basic knowledge score (i.e. a smoothed factor) α>0 for each user who has no tweets, retweets, or conversational tweets with respect to the topic as follows $$\alpha = \min_{U_t} \left( \prod_{f=TS,RI,MI,NS} \left[ \int_{-\infty}^{x_f} N(x; \mu_f, \sigma_f) dx \right]^{w_f} \right)$$

where $U_t$ is the set of users with respect to topic t.

Topical Sentiment counters may be number of positive tweets sent by the user with respect to the topic, number of neutral tweets sent by the user with respect to the topic, and number of negative tweets sent by the user with respect to the topic. Any or all of the scores may be given a sign, whether positive or negative, to indicate a net positive or net negative sentiment on a topic, if desired, or these counters may be used in any other suitable way to provide additional information about the authority of the user with respect to a topic. The counters may be used for example, in connection with the scores to identify users that are impactful in supporting, opposing, or providing un-biased commentary on a topic.

Topical User Impact Score

In some embodiments, a topical user impact score may be computed from the power score and the authority score. In some embodiments, the topical user impact score may be proportional to the product of these scores and may be computed according to the formula: TUIS=R($t_i$)×AS($t_i$) for a given a user $t_i$ with respect to a topic, where R($t_i$) is the topical power score and AS($t_i$) is the topical authority score for user $t_i$. The topical impact for a given user is positive if sum of the user's sentiment count is positive, otherwise, it will be negative if the sum is negative, or neutral if the sum is zero.

Though, in some embodiments, the topical user impact score may be computed with a smoothing factor such that a zero value for one of the authority score and the power score does not lead to a zero impact score if the other of the authority score and the power score is non-zero. In some embodiments, the smoothing factor is such that the impact score may be non-zero, even with a zero value for the authority score. As a specific example, the smoothed impact score may be computed according to the formula: Smoothed Topical Impact Score=Log(R($t_i$)*AS($t_i$)). In other embodiments, the smoothed impact score may be computed according to the formula: Smoothed Topical Impact Score=R($t_i$)*Log(AS($t_i$)).

Use of Topical Impact Score

Regardless of the specific formula used to compute the topical impact score and/or the authority score, the computed scores may be used to select one or more of the users based on their impact. Such a selection, for example, may be made to contact users with high impact or with significant authority with respect to a topic. Such contact may be performed for reasons as are known in the art, including to obtain information from an authoritative user or to the obtained an endorsement or direct marketing to such a user. Selection of a user may be made by an automated process. Contact of the user may also be automated.

However, in some embodiments, an analyst, such as analyst 156 (FIG. 1A) may have a reason to manually analyze impact of a user. Accordingly, a computing device, such as computing device 154 or any other suitable device may present a graphical user interface through which an analyst may interact with topical scores computed as described herein.

Figure 5A:
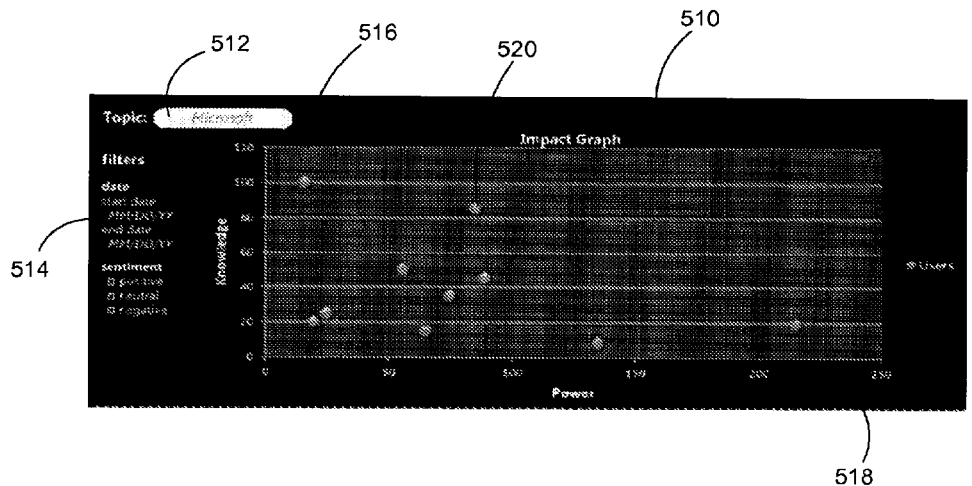
FIG. 5A is an exemplary graphical user interface through which impact scores for each of the plurality of users of the social media platform may be displayed.

FIG. 5A illustrates an exemplary graphical user interface 510 for depicting topical scores. Graphical user interface 510 may be rendered using computer programming techniques as are known in the art. Rendering of the graphical user interface may include rendering controls through which an analyst may input data or select operating parameters of the computing device rendering graphical user interface 510.

In this example, graphical user interface 510 includes an input field 512, through which an analyst may specify a topic about which analysis of users is to be performed. In this example, input field 512 has been completed by the analyst with the phrase "Microsoft," signifying that the analyst would like to identify users of a social media platform based on the impact of messages they send relating to Microsoft. Such an approach may be useful for example, to identify subjects to test out new products. Though, it should be appreciated that the specific reason for performing an analysis is not a limitation on the invention.

Graphical user interface 510 may include other controls for input areas through which an analyst may define parameters of users to be identified by the analysis. In this example, graphical user interface 510 also includes a filter area 514. Through filter area 514, the analyst may identify parameters on the analysis. For example, the analyst may specify a start date and end date. Values of these parameters may determine which messages from a tweet log are used in computing scores indicative of impact. As another example, the analyst may indicate which sentiments are to be included in the analysis. In this example, filter area 514 include checkbox controls through which a user may indicate whether positive, neutral and/or negative sentiment is to be included in the analysis. Based on the selections made through these check boxes, the messages analyzed may be filtered to include only messages with the specified sentiment with respect to the specified topic.

Regardless of the specific filter criteria input by the analyst, any messages meeting the specified criteria may be processed to generate an impact graph as illustrated in graphical user interface 510. Each user for which an impact score is computed may be represented as a point on the impact graph. In this example, the impact graph has an axis 516 for a knowledge score and an axis 518 for a power score. Each user may be represented at a location on the impact graph along the axis 516 determined by a knowledge score, which in this example may be the same as or derived from the authority score, as described above. Each user may be represented at a location on the impact graph along the axis 518 determined by a power score, as described above.

In this example, the user represented by point 520 has a knowledge score slightly above 80 and a power score of approximately 90. Other users having different knowledge and power scores are represented by other points on the graph.

Depicting users based on an impact graph formed for a selectable topic allows an analyst to identify users with desirable characteristics. In some scenarios, users with greater power may be preferred. In other scenarios users with greater knowledge may be preferred. In yet other scenarios, users with both significant knowledge and power may be preferred. Presenting users on an impact graph as illustrated allows an analyst to select users with desired impact characteristics.

In the embodiment illustrated, the points representing users on the impact graph may also serve as controls. When an analyst selects a point on the impact graph, a computing device rendering graphical user interface 510 may provide information on the user associated with that point.

Figure 5B:
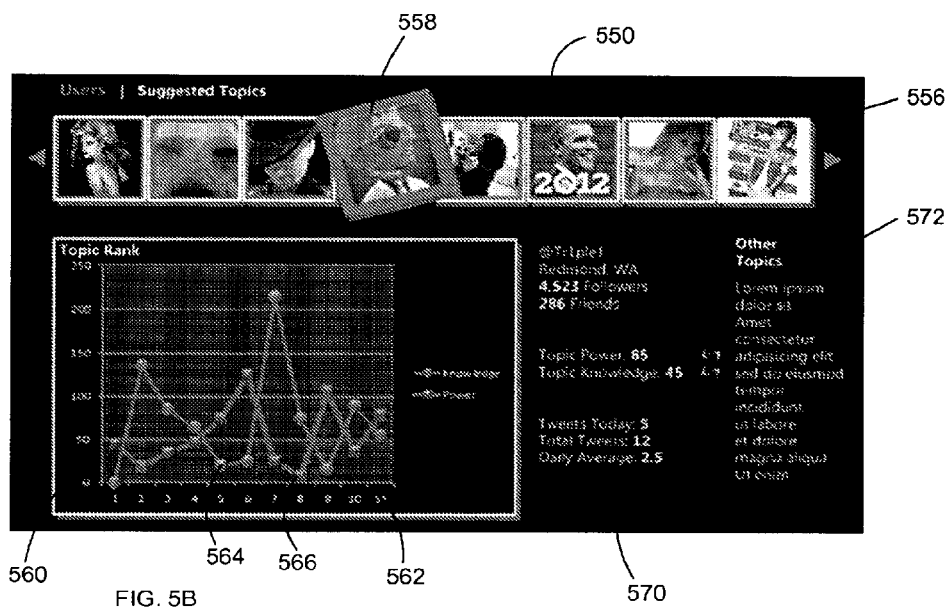
FIG. 5B is an exemplary graphical user interface through which time varying impact scores for a user of a social media platform may be displayed.

In some embodiments, providing additional information on a selected user may entail presenting an alternative graphical user interface. For example, graphical user interface 550, as illustrated in FIG. 5B, may be presented. Graphical user interface 550 presents information about a single user. Though, graphical user interface 550 includes a control area 556 through which an analyst may select different users. In the scenario illustrated in FIG. 5B, a user represented by icon 558 has been selected. Icons for other users are shown in control area 556, allowing an analyst to select other users. When another user is selected, the information displayed in graphical user interface 550 may change, such that information about the selected user is displayed in place of the information about the user represented by icon 558.

Any suitable information may be depicted about the selected user. In this example, information about the user's impact with respect to a topic is presented graphically. In this case, the user's impact is depicted as a function of time. In this specific example of FIG. 5B, that impact is illustrated with a graph with an axis 562 indicating time intervals. Any suitable increments of time, such as minutes, hours or days, may be reflected on axis 562.

Axis 560 reflects the magnitude of impact scores. In the scenario illustrated in FIG. 5B, the graph includes a curve 564 representing a data set for knowledge scores. The graph also includes a curve 566 of power scores. In this example, the knowledge scores and power scores are computed with respect to the same topic and are computed for the same increments of time.

Scaling of the axes in graphical user interface 550 and graphical user interface 510 may be performed in any suitable way. In some embodiments, for example, when knowledge and power scores are computed for each of multiple users, the maximum score may be identified and arbitrarily scaled to equal 1,000 on axis 560. Other values of the scores may be scaled proportionately. Though, it should be appreciated that the specific scaling used to depict values is not critical to the invention.

Information, instead of or in addition to a time varying graph, may be presented about a selected user. In the example of FIG. 5B, graphical user interface 550 includes a display area 570 providing in textual format additional information about the selected user. In this example, display area 570 includes information such as a name and location of the user. Additionally, statistics about usage of the social media platform may be provided. In this example, graphical user interface 550 indicates that the user about which information is being presented has 4,523 followers and 286 friends. Additionally, information is also shown displayed about the number of messages sent by the user. In this example, those numbers include total number of messages used in computing scores for the user, the number of messages cents in the current time interval for which data is being displayed and the average number of messages per time interval.

The messages about which numbers are provided in this case may be messages related to the selected topic. These numbers may also be used to compute power and/or knowledge scores over some interval, which in this example may be the entire interval depicted on axis 562. In this example, graphical user interface 550 depicts a power score of 85 and a knowledge score of 45 in a display area 570. In conjunction with these scores, an indication of sentiment may also be provided. In this example, sentiment is provided using a thumbs up icon, indicating a positive sentiment about the topic, or a thumbs down icon, indicating a negative sentiment.

As a further example of the type of information that may be included in a graphical user interface providing information about a selected user, a control area 572 may be provided. An analyst interacting with a computer system through graphical user interface 550 may use control area to select a different topic. Upon selection of a different topic, a computing system rendering graphical user interface 550 may contain different information for the user, based on topic-based scores appropriate for the newly selected topic. Other data may similarly be selected for display based on the selected topic. This information may be obtained in any suitable way, including re-computing the information or accessing a store of the previously computed information.

By interacting with user interfaces, such as graphical user interfaces 510 and 550, an analyst may obtain information relevant to the impact of a user with respect to a topic. This information may be used in any suitable way, including for market research and/or to contact a user selected based on scores. Such contact may entail sending a commercial message. Though, it should be recognized that similar analysis may be partially or totally automated.

Regardless of the manner in which information about impacts of users of a social media platform is to be used, the techniques described herein allow the information to be computed in an accurate way and to be simply and quickly computed, possibly by using multiple parallel processes.

Example of Computation of Authority Score

This section gives additional detail of custom function implementation used in a MapReduce algorithm for computing authority metrics and an authority score. These functions are described as pseudo-code, as listed below:

---
ACCUMULATION OF TWO AUTHORITY METRICS OBJECTS
---
1:    method accumulate(authority metrics a, authority metrics b)
2:        a.ts ← a.ts + b.ts
3:        a.ri ← a.ri + b.ri
4:        a.mi ← a.mi + b.mi
5:        a.ns ← a.ns + b.ns
6:        a.ts2 ← b.ts * b.ts
7:        a.ri2 ← b.ri * b.ri
8:        a.mi2 ← b.mi * b.mi
9:        a.ns2 ← b.ns * b.ns ---
AVERAGE FUNCTION TO COMPUTE MEAN AND STANDARD DEVIATION VECTORS
---
1:    method average(authority metrics a)
2:        a.ts = a.ts / a.count
3:        a.ri = a.ri / a.count
4:        a.mi = a.mi / a.count
5:        a.ns = a.ns / a.count
6:        if a.count > 1
7:           a.ts2 = $\sqrt{(a.ts2 - a.count * a.ts * a.ts)/(a.count - 1)}$
8:           a.ri2 = $\sqrt{(a.ri2 - a.count * a.ri * a.ri)/(a.count - 1)}$
9:           a.mi2 = $\sqrt{(a.mi2 - a.count * a.mi * a.mi)/(a.count - 1)}$
10:       a.ns2 = $\sqrt{(a.ns2 - a.count * a.ns * a.ns)/(a.count - 1)}$
11:       else
12:          a.ts2 = $\sqrt{a.ts2 - a.ts * a.ts}$
13:          a.ri2 = $\sqrt{a.ri2 - a.ri * a.ri}$
14:          a.mi2 = $\sqrt{a.mi2 - a.mi * a.mi}$
15:          a.ns2 = $\sqrt{a.ns2 - a.ns * a.ns}$ ---
COMPUTE AUTHORITY METRICS USING GIVEN TOPIC USER VALUE OBJECT
---
1:    method computeMetrics(topic user value v, authority metrics m)
2:        size ← max(v.OT1 + v.RT1, v.mxsc − v.misc + 1)
3:        m.ts ← (v.OT1 + v.RT1) / size
4:        m.ri ← sumFrequency(mu6)*log(mu6.size( ))
5:        m.ri ← m.rs − sumFrequency(mu3)*log(mu3.size( ))
6:        m.mi ← sumFrequency(mu4)*log(mu4.size)
7:        m.mi ← m.mi − sumFrequency(mu1)*log(mu1.size( ))
8:        m.ns ← sumFrequency(m4)*log(m4.size( ))
9:        m.ns ← m.ns − sumFrequencey(mu2)*log(mu2.size( ))

---
MERGE TWO TOPIC USER VALUE OBJECTS
---
1:    method add(topic user value t, topic user value o)
2:        t.OT1 ← t.OT1 + o.OT1
3:        t.RT1 ← t.RT1 + o.RT1
4:        if t.misc > o.misc
5:           t.misc ← o.misc
6:        if t.mxsc < o.mxsc
7:           t.mxsc ← o.mxsc
8:        merge(t.mu1, o.mu1)
9:        merge(t.mu2, o.mu2)
10:       merge(t.mu3, o.mu3)
11:       merge(t.mu4, o.mu4)
12:       merge(t.mu5, o.mu5)
13:       merge(t.mu6, o.mu6)

---
MERGE TWO USER ID-FREQUENCY MAP
---
1:    method addAll(map<string, integer> t, map<string, integer> o)
2:        for each key in o.keySet
3:           if t contains key
4:               put (key, t.get(key)+o.get (key)) to t
5:           else
6:               put (key, o.get(key)) to t

ADD (KEY, VALUE) TO A MAP CONTAINER, I.E. OPERATOR "←+", FOR USER OBJECT VALUE

---
1:    method add((topic user id uid, topic user value v), map u)
2:        if u contains key uid
3:           merge(topic user value u.get(uid), v)
4:        else
5:           put (uid, v) to u

ADD (KEY, VALUE) TO A MAP CONTAINER, I.E. OPERATOR "←+", FOR INTEGER VALUE

Figure 6:
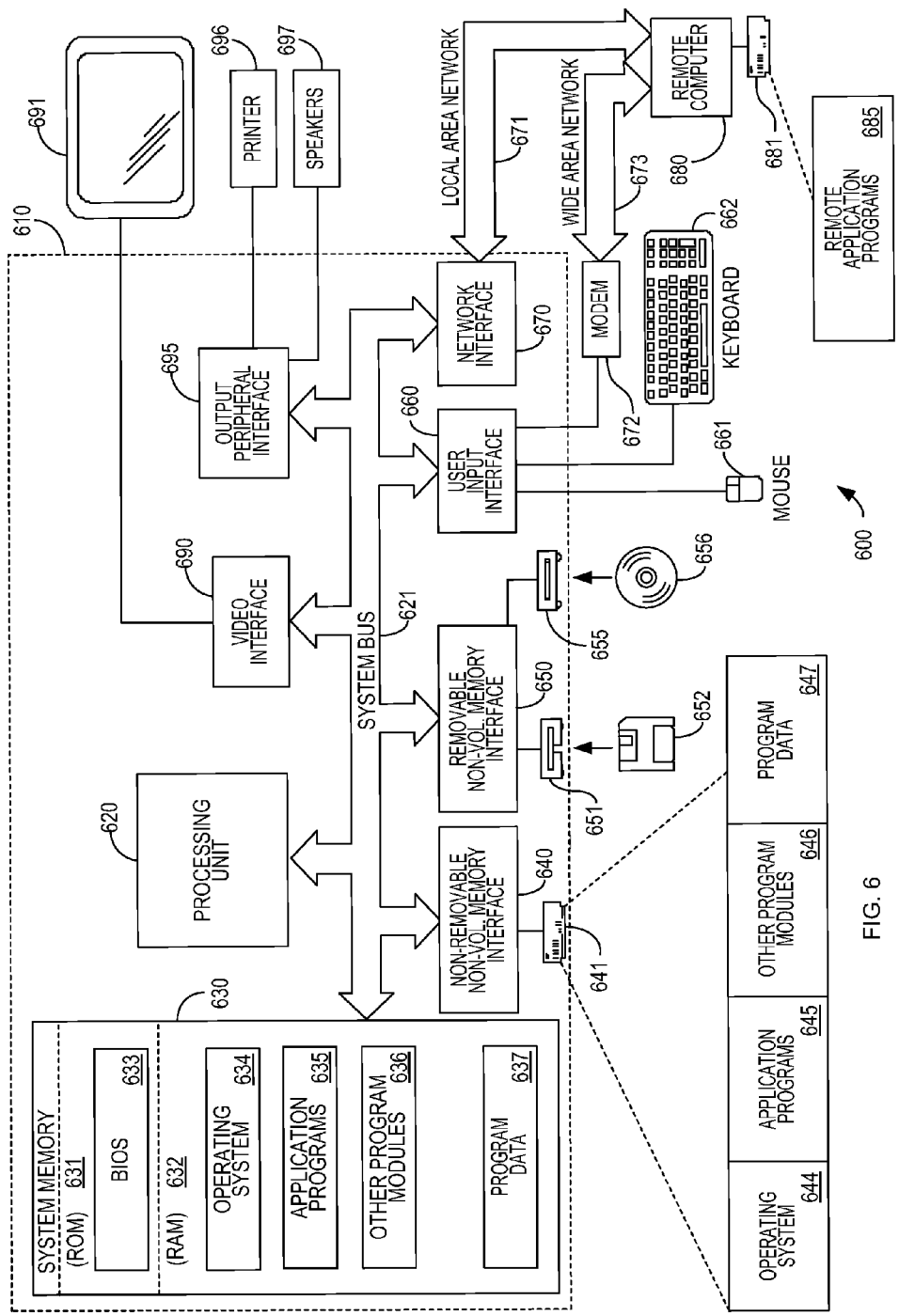
FIG. 6 is a block diagram of an exemplary computer system that may be used in performing some or all of the computations described herein.

---
1:    method add((topic user id uid, integer v), map m)
2:        if u contains key uid
3:           put (uid, v + m.get(uid)) to m
4:        else
5:           put (uid, v) to m The foregoing computations and other functions may be implemented in any suitable computing device or devices. FIG. 6 illustrates an example of a suitable computing system environment 600 on which some or all of the computations and/or user interactions described herein may be implemented. The computing system environment 600 is only one example of a suitable computing environment and is not intended to suggest any limitation as to the scope of use or functionality of the invention. Neither should the computing system environment 600 be interpreted as having any dependency or requirement relating to any one or combination of components illustrated in the computing system environment 600.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, examples are given of analyzing data from a single social media platform. TWITTER is used as an example of such a social media platform. Though, analyses as described herein may be performed on messages sent by any social media platform. Moreover, in some embodiments, information may be collected from messages transmitted using multiple social media platforms. These messages may be fused, for example, by reducing them into a common format that identifies the sender of the message, a topic and a sentiment about the topic. Though, the information may be fused in any suitable way.

Moreover, though examples are provided in which communications within a single social network are analyzed. However, the invention is not so limited. In some social media platforms, for example, messages distributed within one social network may conveyed to other social networks. As a specific example, a message may be re-distributed by a recipient to members of a social network including the recipient and, alternatively or additionally, may be directed to others outside of that social network. Where such communications are logged, they may also be used in analysis. As a specific example, a tweet might be forwarded using e-mail to a user who is not in a social network with the recipient, but such forwarding may be considered along with a retweet within a social network of the recipient for computing metrics as described herein.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion among a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system comprising:
a processing device; and
a storage device storing computer-executable instructions which, when executed by the processing device, cause the processing device to:
access records of messages sent or received by a plurality of users;
based at least in part on the messages, determine a power of a user to reach other users, the power associated with a number of other users that received a portion of the messages from the user;
determine an authority of the user on a topic based at least in part on counts of forwarded messages authored by the user on the topic;
compute an impact score that reflects both the power and the authority of the user on the topic; and
based at least in part on the impact score, contact the user in relation to the topic.

2. The system of claim 1, wherein the computer-executable instructions further cause the processing device to obtain the messages from a log of messages for a social media platform.

3. The system of claim 1, wherein the computer-executable instructions further cause the processing device to extract the topic from the messages.

4. The system of claim 3, wherein the topic is extracted from the messages by identifying words or other symbols in the messages that relate to the topic.

5. The system of claim 1, wherein the computer-executable instructions further cause the processing device to compute the impact score for the user based at least in part on the messages being affirmed by other users that receive the messages.

6. The system of claim 1, wherein the messages used to compute the impact score correspond to a time interval.

7. The system of claim 1, wherein the computer-executable instructions further cause the processing device to compute the impact score in a manner that supports identification of trends.

8. The system of claim 7, wherein the computer-executable instructions further cause the processing device to support the identification of trends by repeatedly computing the impact score using portions of the messages from successive time intervals.

9. The system of claim 1, wherein the power is associated with a number of followers of the user.

10. The system of claim 1, wherein the computer-executable instructions further cause the processing device to, based at least in part on the impact score, contact the user to request information on the topic.

11. The system of claim 1, wherein the computer-executable instructions further cause the processing device to, based at least in part on the impact score, send information related to the topic to the user.

12. The system of claim 1, wherein the computer-executable instructions further cause the processing device to, based at least in part on the impact score, monitor the user after an event related to the topic.

13. A system comprising:
a processing device; and
a storage device storing computer-executable instructions which, when executed by the processing device, cause the processing device to:
access messages sent or received by users;
process at least a portion of the messages to compute:
a power score reflecting a number of followers of an individual user,
an authority score reflecting a number of forwarded messages on a topic that are authored by the individual user, and
an impact score of the individual user relating to the topic and based at least in part on the power score and the authority score;
receive a selection of the individual user; and
responsive to the selection, provide a graphical representation of the impact score of the individual user.

14. The system of claim 13, wherein the graphical representation comprises a chart depicting the power score and the authority score.

15. The system of claim 13, wherein the graphical representation depicts changes in the impact score over time.

16. The system of claim 13, wherein the computer-executable instructions further cause the processing device to present a sentiment ratio of the individual user with respect to the topic.

17. A method implemented by a computing device, the method comprising:
determining counts of messages that relate to a topic and meet criteria relating to users that sent or received the messages;
computing knowledge scores based at least in part on the counts, wherein an individual count of messages authored by an individual user on the topic and forwarded by other users reflects knowledge of the individual user on the topic;
computing power scores reflecting power of the users to reach other users, wherein an individual power score for the individual user is based at least in part on a number of other users that received a portion of the messages from the individual user;
based at least in part on the knowledge scores and the power scores, determining impact scores related to the topic;
receiving a selection of the individual user; and
responsive to the selection, providing an individual impact score of the individual user.

18. The method of claim 17, further comprising receiving user input indicating the topic.

19. The method of claim 17, wherein the criteria relating to the users comprise the messages on the topic being sent by the users over a computer network, being forwarded by the users over the computer network, or including mentions of the users.

20. The method of claim 17, wherein the counts of messages relating to the topic include one or more of:
- a number of the messages authored by a particular user;
- a number of the messages forwarded by the particular user;
- a total number of the messages sent by the particular user;
- a number of the messages authored by the particular user and forwarded by other users;
- a number of mentions of the particular user in the messages; and
- a number of other users that mentioned the particular user in the messages.

* * * * *